(12) United States Patent
Jensen et al.

(10) Patent No.: US 11,173,606 B2
(45) Date of Patent: Nov. 16, 2021

(54) CONTROL SYSTEM ARCHITECTURE AND DISTRIBUTED HUMAN-MACHINE INTERFACE FOR ROBOT CONTROL

(71) Applicant: Creator, Inc., San Francisco, CA (US)

(72) Inventors: Jeff C. Jensen, San Francisco, CA (US); Steven Frehn, San Francisco, CA (US); Cameron Bennett, San Francisco, CA (US); James Riley, San Francisco, CA (US); David Bordow, San Francisco, CA (US); Alexandros Vardakostas, San Francisco, CA (US)

(73) Assignee: Creator, Inc., San Francisco, CA (US)

( * ) Notice: Subject to any disclaimer, the term of this patent is extended or adjusted under 35 U.S.C. 154(b) by 321 days.

(21) Appl. No.: 16/351,123

(22) Filed: Mar. 12, 2019

(65) Prior Publication Data
US 2019/0275676 A1     Sep. 12, 2019

Related U.S. Application Data

(60) Provisional application No. 62/672,034, filed on May 15, 2018, provisional application No. 62/641,968, filed on Mar. 12, 2018.

(51) Int. Cl.
*B25J 3/00* (2006.01)
*B25J 9/16* (2006.01)
(Continued)

(52) U.S. Cl.
CPC .......... *B25J 9/1674* (2013.01); *B25J 9/1689* (2013.01); *B25J 13/006* (2013.01); *H04L 67/12* (2013.01)

(58) Field of Classification Search
CPC ...... B25J 9/1674; B25J 9/1689; B25J 13/006; H04L 67/12
(Continued)

(56) References Cited

U.S. PATENT DOCUMENTS

| | | | |
|---|---|---|---|
| 7,996,109 B2 * | 8/2011 | Zini | G06K 7/0008 |
| | | | 700/245 |
| 9,104,271 B1 * | 8/2015 | Adams | G06F 3/014 |

(Continued)

FOREIGN PATENT DOCUMENTS

| | | | |
|---|---|---|---|
| JP | 2016198839 A | * | 12/2016 |
| JP | 2018005947 A | | 1/2018 |
| KR | 20170034752 A | | 3/2017 |

OTHER PUBLICATIONS

International Search Report and Written Opinion for PCT Application No. PCT/US2019/021919; dated Jun. 20, 2019; 9 pages.

*Primary Examiner* — Dalena Tran
(74) *Attorney, Agent, or Firm* — Miller Johnson

(57) ABSTRACT

In response to a first condition in a first subsystem of a robot, a controller halts operation of the first subsystem; transmits a set command specifying a first notification to an interface system; obtains status information from the interface system; and, in response to the status information indicating that the first notification has a cleared status, resumes operation of the first subsystem. The interface system maintains a set of active notifications and tracks a set of devices configured to receive notifications. Each of the devices is associated with a respective operator. In response to receiving the set command, the interface system: adds the first notification to the set of active notifications; determines a subset of devices to receive the first notification; wirelessly transmits the first notification to the subset; and, in response to receiving a clear message specifying the first notification, sets the first notification to the cleared status.

20 Claims, 14 Drawing Sheets

| Source | Notification Subsystem | Code | Message | Priority Level | Clear Authority | Recipients | Clear on Clear | Clear on Raise |
|---|---|---|---|---|---|---|---|---|
| robot1 | bun | 1a | "Reload buns" | 7 | "robot" | "all" | [] | [] |
| robot1 | bun | 1b | "Reload buns now" | 2 | "robot" | "all" | [] | ["1a"] |
| robot1 | cooker | 1a | "Empty grease trap" | 3 | "operator" | "all" | [] | [] |
| ... | ... | ... | ... | ... | ... | ... | ... | ... |
| robot2 | bun | 1a | "Reload buns" | 7 | "robot" | "all" | [] | [] |
| robot2 | bun | 1b | "Reload buns now" | 2 | "robot" | "all" | [] | ["1a"] |
| robot2 | cooker | 1a | "Empty grease trap" | 3 | "operator" | "all" | [] | [] |
| ... | ... | ... | ... | ... | ... | ... | ... | ... |

260

(51) Int. Cl.
  *H04L 29/08* (2006.01)
  *B25J 13/00* (2006.01)
(58) Field of Classification Search
  USPC ............... 700/249, 83, 86; 702/1, 108, 127
  See application file for complete search history.

(56) References Cited

U.S. PATENT DOCUMENTS

| | | |
|---|---|---|
| 2005/0004707 A1 | 1/2005 | Kazi et al. |
| 2015/0170524 A1* | 6/2015 | Stefani ................. G05D 1/0027 701/120 |
| 2017/0235301 A1 | 8/2017 | Atohira et al. |
| 2017/0334062 A1* | 11/2017 | Allen ................... B25J 11/0005 |

* cited by examiner

| Source | Subsystem | Notification Code | Message | Priority Level | Clear Authority | Recipients | Clear on Clear | Clear on Raise |
|---|---|---|---|---|---|---|---|---|
| robot1 | bun | 1a | "Reload buns" | 7 | "robot" | "all" | [] | [] |
| robot1 | bun | 1b | "Reload buns now" | 2 | "robot" | "all" | [] | ["1a"] |
| robot1 | cooker | 1a | "Empty grease trap" | 3 | "operator" | "all" | [] | [] |
| ... | ... | ... | ... | ... | ... | ... | ... | ... |
| robot2 | bun | 1a | "Reload buns" | 7 | "robot" | "all" | [] | [] |
| robot2 | bun | 1b | "Reload buns now" | 2 | "robot" | "all" | [] | ["1a"] |
| robot2 | cooker | 1a | "Empty grease trap" | 3 | "operator" | "all" | [] | [] |
| ... | ... | ... | ... | ... | ... | ... | ... | ... |

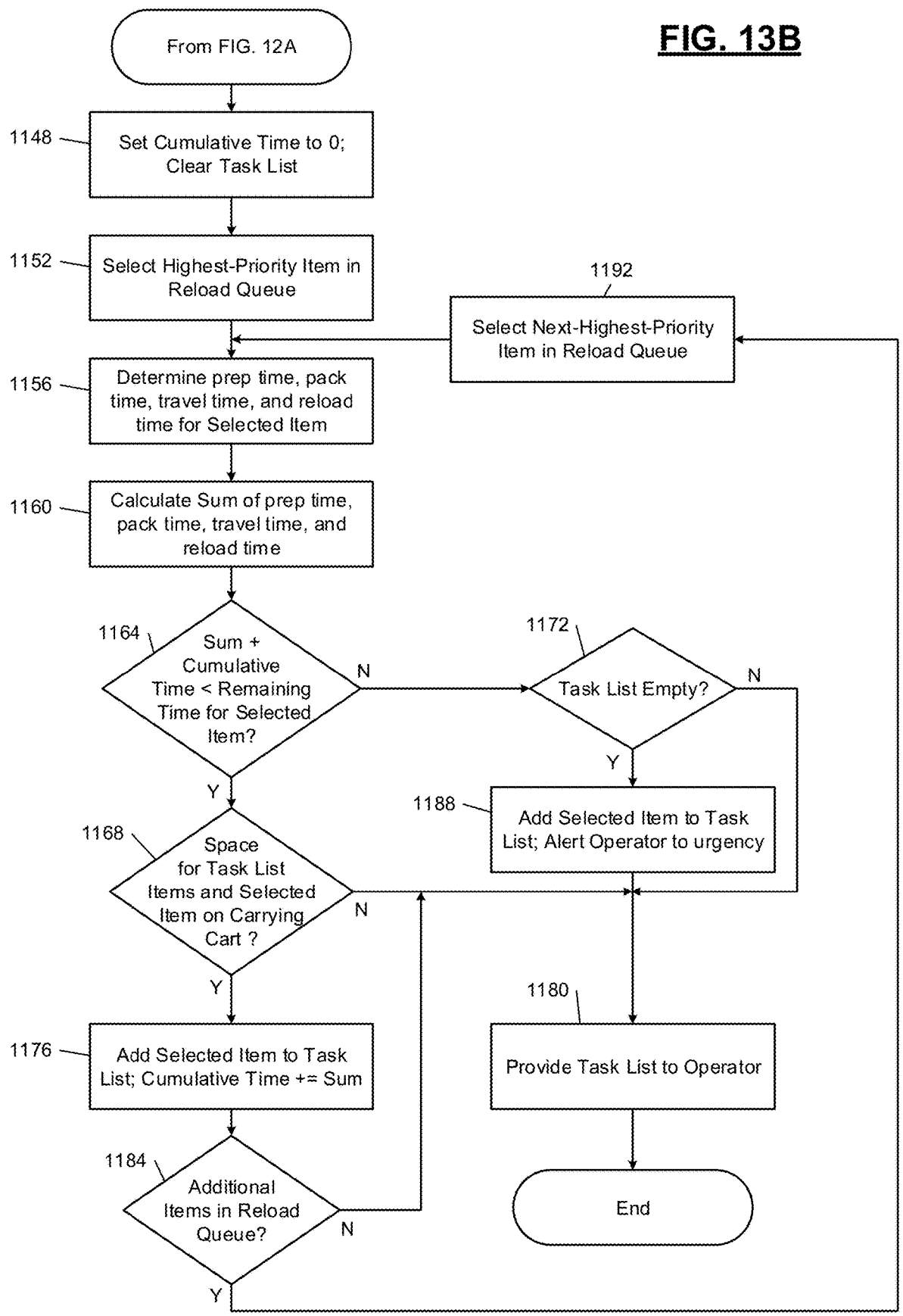

CONTROL SYSTEM ARCHITECTURE AND DISTRIBUTED HUMAN-MACHINE INTERFACE FOR ROBOT CONTROL

CROSS-REFERENCE TO RELATED APPLICATIONS

This application claims the benefit of U.S. Provisional Application No. 62/641,968, filed Mar. 12, 2018 and U.S. Provisional Application No. 62/672,034, filed May 15, 2018. The entire disclosures of the applications referenced above are incorporated by reference.

FIELD

The present disclosure relates to robot control systems and methods and more particularly to human-machine interfaces for robot control.

BACKGROUND

Traditionally, robots have been controlled by fixed operator stations, such as touchscreens and desktop computer systems, as well as mechanical switches. Control systems typically interact with the robots over proprietary industrial interfaces, such as Factory Instrumentation Protocol (FIP) or Foundation Fieldbus from FieldComm Group.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A robotics control system includes a robot controller for a robot and an interface system. The robot controller is configured to, in response to a first condition in a first subsystem of the robot: halt operation of the first subsystem; transmit a set command specifying a first notification to the interface system; obtain status information from the interface system regarding the first notification; and in response to the status information indicating that the first notification has a cleared status, resume operation of the first subsystem. The interface system is configured to: maintain a set of active notifications and track a set of devices configured to receive notifications. Each of the set of devices is associated with a respective operator. The interface system is configured to, in response to receiving the set command from the robot controller: add the first notification to the set of active notifications; determine a first subset of devices of the set of devices to receive the first notification; wirelessly transmit the first notification to the first subset of devices; and in response to receiving a clear message specifying the first notification from one of the first subset of devices, set the first notification to the cleared status in the set of active notifications.

In other features, the robot controller is configured to, in response to a second condition in the first subsystem of the robot, transmit a set command specifying a second notification to the interface system while continuing operation of the first subsystem. In further features, the robot controller is configured to, when a clear-on-raise relationship is present between the first notification and the second notification, set the second notification to the cleared status in response to the first condition.

In yet further features, the robot controller is configured to maintain an internal set of active notifications, and set the second notification to the cleared status by setting the second notification to the cleared status in the internal set of active notifications. In other features, the robot controller is configured to set the second notification to the cleared status by transmitting a clear command specifying the second notification to the interface system. In yet other features, the first condition corresponds to a parameter of the first subsystem crossing a first threshold. The second condition corresponds to the parameter of the first subsystem crossing a second threshold different than the first threshold.

In other features, the robot controller is configured to identify a resumption condition based on a physical sensor associated with the first subsystem and in response to identifying the resumption condition, transmit a clear command specifying the first notification to the interface system.

In yet other features, the interface system is configured to operate a hypertext transfer protocol (HTTP) server. The robot controller is configured to transmit the set command to the interface system by transmitting a first HTTP request to the HTTP server. In further features, the robot controller is configured to obtain status information from the interface system by transmitting a second HTTP request to the HTTP server.

In other features, the robot controller is configured to transmit a set of potential notifications to the interface system in response to power-on of the robot. In further features, the robot controller is configured to assemble the set of potential notifications from a plurality of subsystems of the robot, including the first subsystem. In yet further features, the robot controller is configured to tag each of the set of potential notifications with a corresponding identifier of one of the plurality of subsystems.

In other features, the robot controller is configured to receive the first notification from the first subsystem in response to the first subsystem identifying the first condition. In further features, the robot controller is configured to tag the first notification with an identifier of the first subsystem and specify the tag when transmitting the set command to the interface system.

In other features, the robot controller is configured to operate first and second network interfaces. The first and second network interfaces are isolated from each other and not routable between each other. The first network interface is configured to communicate with a plurality of subsystems of the robot, including the first subsystem. The second network interface is configured to communicate with the interface system.

In further features, the second network interface is configured to communicate with an ordering system. The robot controller is configured to, in response to receiving specification of a food item from the ordering system, control the first subsystem to prepare the food item.

In other features, the interface system is configured to, for each device of the set of devices, assign a role from a predetermined plurality of roles. The interface system is also configured to determine the first subset of devices based on the assigned roles. In further features, the interface system is configured to, for each device of the first subset of devices, assign a priority for the first notification based on the assigned role.

In other features, the interface system is configured to, for each device of the first subset of devices, provide the first notification to the device in response to a connection request from the device. In further features, the connection request is via a WebSocket. In other features, the interface system is configured to selectively provide the first notification to a push service for distribution to the first subset of devices.

In other features, the interface system is configured to operate a hypertext transfer protocol (HTTP) server. The interface system is configured to receive the clear message from the one of the first subset of devices via a first HTTP request to the HTTP server.

In yet other features, the interface system is configured to, in response to receiving a claim message from the one of the first subset of devices, notify a remainder of the first subset of devices that the first notification has been claimed.

In further features, the interface system is configured to operate a hypertext transfer protocol (HTTP) server. The interface system is configured to receive the claim message from the one of the first subset of devices via a first HTTP request to the HTTP server.

A robotics control method for a robot includes maintaining a set of active notifications and tracking a set of devices configured to receive notifications. Each of the set of devices is associated with a respective operator. The method also includes, in response to generation of a set command specifying a first notification: adding the first notification to the set of active notifications; determining a first subset of devices of the set of devices to receive the first notification; wirelessly transmitting the first notification to the first subset of devices; and in response to receiving a clear message specifying the first notification from one of the first subset of devices, setting the first notification to a cleared status in the set of active notifications. The method further includes, in response to a first condition in a first subsystem of the robot: halting operation of the first subsystem; generating the set command specifying the first notification; and in response to status information of the first notification indicating the cleared status, instructing the first subsystem to resume operation.

In other features, the method includes, in response to a second condition in the first subsystem of the robot, generating a set command specifying a second notification while continuing operation of the first subsystem. In further features, the method includes, when a clear-on-raise relationship is present between the first notification and the second notification, setting the second notification to the cleared status in response to the first condition.

In yet further features, the method includes maintaining an internal set of active notifications and setting the second notification to the cleared status by setting the second notification to the cleared status in the internal set of active notifications. In other features, the method includes setting the second notification to the cleared status by generating a clear command specifying the second notification. In yet other features, the first condition corresponds to a parameter of the first subsystem crossing a first threshold. The second condition corresponds to the parameter of the first subsystem crossing a second threshold different than the first threshold.

In other features, the method includes identifying a resumption condition based on a physical sensor associated with the first subsystem and in response to identifying the resumption condition, generating a clear command specifying the first notification.

In yet other features, the method includes operating a hypertext transfer protocol (HTTP) server and generating the set command by transmitting a first HTTP request to the HTTP server. In further features, the method includes obtaining the status information by transmitting a second HTTP request to the HTTP server.

In other features, the method includes generating a set of potential notifications in response to power-on of the robot. In further features, the method includes assembling the set of potential notifications from a plurality of subsystems of the robot, including the first subsystem. In yet further features, the method includes tagging each of the set of potential notifications with a corresponding identifier of one of the plurality of subsystems.

In other features, the method includes receiving the first notification from the first subsystem in response to the first subsystem identifying the first condition. In further features, the method includes tagging the first notification with an identifier of the first subsystem and specifying the tag when generating the set command.

In other features, the method includes operating first and second network interfaces. The first and second network interfaces are isolated from each other and not routable between each other. The first network interface is configured to communicate with a plurality of subsystems of the robot, including the first subsystem. The second network interface is configured to communicate with the set of devices.

In further features, the second network interface is configured to communicate with an ordering system. The method includes, in response to receiving specification of a food item from the ordering system, controlling the first subsystem to prepare the food item.

In other features, the method includes for each device of the set of devices, assigning a role from a predetermined plurality of roles. The method further includes determining the first subset of devices based on the assigned roles. In further features, the method includes, for each device of the first subset of devices, assigning a priority for the first notification based on the assigned role.

In other features, the method includes, for each device of the first subset of devices, providing the first notification to the device in response to a connection request from the device. In further features, the connection request is provided via a WebSocket. In other features, the method includes selectively providing the first notification to a push service for distribution to the first subset of devices.

In other features, the method includes operating a hypertext transfer protocol (HTTP) server and receiving the clear message from the one of the first subset of devices via a first HTTP request to the HTTP server.

In yet other features, the method includes, in response to receiving a claim message from the one of the first subset of devices, notifying a remainder of the first subset of devices that the first notification has been claimed. In further features, the method includes operating a hypertext transfer protocol (HTTP) server and receiving the claim message from the one of the first subset of devices via a first HTTP request to the HTTP server.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 3 is a graphical representation of a subset of example notifications of a notification library.

FIG. 13A and FIG. 13B together form a flowchart of example task consolidation operation according to the principles of the present disclosure.

In the drawings, reference numbers may be reused to identify similar and/or identical elements.

DETAILED DESCRIPTION

Introduction

In an environment where humans and one or more robots interact, a well-designed human-machine interface (HMI) can improve safety, increase productivity of the robot, and increase the efficiency of the human operators. Instead of conventional fixed-location HMIs, the present disclosure describes wearable devices that allow for more operator flexibility, allow for more movement, and improve responsiveness.

Figure 1:
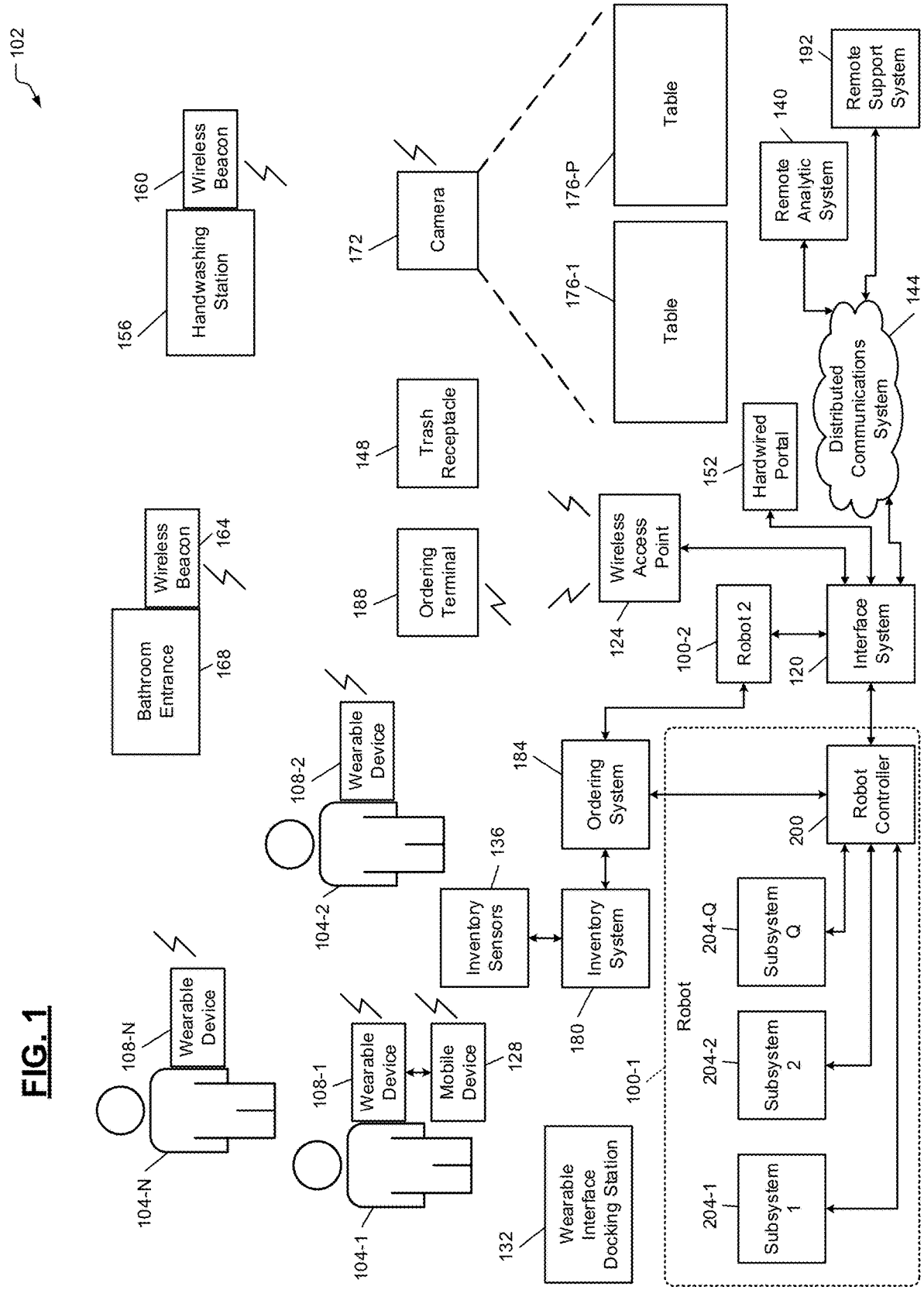
FIG. 1 is a high-level functional block diagram of an example implementation of a business with an interface system according to the principles of the present disclosure.

For example, in FIG. 1, a first robot 100-1 and a second robot 100-2 (collectively, robots 100) are located at a business 102 and operated by human operators 104-1, 104-2, ... 104-N (collectively, operators 104). Each of the operators 104 have a respective wearable device 108-1, 108-2, ... 108-N (collectively, wearable devices 108). The wearable devices 108 may include one or more of glasses-mounted displays or other augmented reality (AR) displays, smart watches, and wearable smartphones (such as a smartphone worn on a user's upper arm using an armband). The business 102 may be a single building or span across multiple buildings. In some implementations, a majority of the business 102 may be located within a single room.

The wearable devices 108 communicate with the robots 100 via an interface system 120. Although two robots 100 are shown, the present disclosure applies to environments where only a single robot is present and where more than two robots are present. The wearable devices 108 use wireless transceivers to communicate with a wireless access point 124. The wireless access point 124 may be part of the interface system 120 or may connect to the interface system 120 via a local area network (LAN) such as IEEE 802.3.

The wearable devices 108 may include wireless transceivers or may be wired to a device that includes a wireless transceiver. For example, if the wearable device 108-N does not include a wireless transceiver, the wearable device 108-N may have a wired interface to a wireless device (not shown) having a battery pack and a wireless transceiver. The wireless device could be worn on a belt or placed in a pocket of the operator 104-N.

In some implementations, the wearable devices 108 may interface wirelessly with another device instead of or in addition to directly communicating with the wireless access point 124. As an example only, the wearable device 108-1 is shown in association with a mobile device 128. For example only, the wearable device 108-1 may communicate with the mobile device 128 using a wireless personal area network (WPAN), such as Bluetooth. The mobile device 128 may remain in the pocket of the operator 104-1 or may be located at a fixed location within an effective wireless range of the wearable device 108-1.

When not being worn by the operators 104, the wearable devices 108 may be placed at a wearable interface docking station 132, where the wearable devices 108 can be charged through a wired interface or wirelessly. In addition, the wearable devices 108 may be provisioned and have their firmware and software updated while located at the wearable interface docking station 132. In instances where mobile devices, such as the mobile device 128, are used, the mobile devices may also be charged at the wearable interface docking station 132.

In various implementations, the operators 104 may wear the wearable devices 108 even when not at the business 102. For example, the wearable devices 108 may be used outside of the business 102 by the operators 104 for personal benefit, such as for monitoring personal notifications and fitness tracking. When the wearable devices 108 leave the proximity of the business 102, the wearable devices 108 may change to a personal mode in which software for interacting with the robots 100 may be disabled. In addition, data related to the business 102 may be encrypted and, when outside of the business 102, encryption keys may be removed or rendered inaccessible.

The wireless access point 124 may be used to geo-fence the business 102 such that disconnection of the wearable device 108-1 from the wireless access point 124 indicates that the operator 104-1 has left the business 102. This may also permit the operator 104-1 to automatically sign out at the end of their shift.

When the operators 104 begin work, the operators 104 may establish which of the wearable devices 108 they are using. For example, the operator 104-1 may obtain the wearable device 108-1 from the wearable interface docking station 132. The operator 104-1 may register for work by signing in to a computer interface at the wearable interface docking station 132. The operator 104-1 may then indicate to the wearable interface docking station 132 that they have obtained the wearable device 108-1. For example, the wearable device 108-1 may be labeled with a unique identifier that the operator 104-1 can supply to the wearable interface docking station 132.

In other implementations, the wearable interface docking station 132 may assign the wearable device 108-1 to the operator 104-1 when the operator 104-1 reports to work. In the implementation where the operator 104-1 wears the wearable device 108-1 outside of the business 102, a long-term association between the operator 104-1 and the wearable device 108-1 may be established in the wearable interface docking station 132.

In fact, arrival of the wearable device 108-1 at the business 102 may indicate that the operator 104-1 has arrived for work. The operator 104-1 may simply begin working, since the wearable device 108-1 is able to indicate to the interface system 120 that the operator 104-1 is present and working. In some implementations, the wearable device 108-1 will display a prompt to the operator 104-1 allowing the operator 104-1 to indicate whether they are ready for work. For example, the operator 104-1 may have arrived early and therefore will not begin work immediately. In another situation, the operator 104-1 may be visiting the business 102 but not for work. In various implementations, the wearable device 108-1 may also alert the operator 104-1 of the beginning of a scheduled work shift.

As described in more detail below, the wearable devices 108 include operating software that allows the operators 104 to control the robots 100. For example, the robots 100 may send notifications to the interface system 120 indicating that certain actions or tasks are needed. These notifications are provided to one or more of the operators 104 via respective ones of the wearable devices 108.

For example, a supply needed by one of the robots 100 may be running low or may be exhausted and therefore one of the operators 104 can address this deficiency. As described in more detail below, the operators 104 may assume different roles at the business 102. These roles may be established semi-permanently, as in the case of a store manager.

In various implementations, a role may be assumed for the duration of the shift. In still other implementations, the roles of the operators 104 may change multiple times during a shift. For example, the interface system 120 may reassign the operators 104 based on requests from the operators 104. In other implementations, the operators 104 may request role changes. The interface system 120 may also suggest a change in role, which will take effect once approved by the operators 104.

In various implementations, the location of the operators 104 within the business may dictate the role. As an example only, the business 102 may be a restaurant and the robots 100 may prepare food. If the operator 104-1 is near a public area of the business 102, the operator 104 may automatically be assigned a customer-facing role, such as concierge. Meanwhile, when the operator 104-2 is located in an employee-only area behind the robots 100, the operator 104-2 may assume the role of robot operator. When the operator 104-N is located near inventory sensors 136, the operator 104-N may assume the role of ingredient preparation.

The interface system 120 may distribute notifications to the operators 104 based on their role. In addition, the interface system 120 may prioritize notifications based on role. For example, if the operator 104-N is located near the inventory sensors 136, notifications related to ingredient shortages at the robots 100 may be transmitted to the operator 104-N as higher priority. Meanwhile, when the operator 104-1 has assumed the role of concierge, the interface system 120 may de-prioritize notifications related to the robots 100. In this way, the operator 104-1 can focus on customer service.

The wearable devices 108 may track performance of activities by the operators 104. For example, the wearable devices 108 may continuously monitor locations of the operators 104 within the business 102 and correlate those locations with times during which tasks were performed. This data may later be analyzed to improve efficiency, such as by adjusting how tasks are delegated and by changing parameters of a task, such as by changing the location of an item needed for the task.

A remote analytic system 140 may be located outside of the business 102 and communicate with the interface system 120 via a distributed communications system 144, such as the Internet. In various implementations, the remote analytic system 140 may be hosted at the business 102 and accessible remotely via the distributed communications system 144. Analysts from within the business 102 or at other locations may use the remote analytic system 140 to analyze data obtained by the wearable devices 108.

As described in more detail below, the wearable devices 108 notify the operators 104 of notifications, such as those received from the robots 100. The operators 104, via the wearable devices 108, can claim tasks (indicating an intention to perform the task) and clear tasks (indicating that the task has been completed).

In some implementations, the wearable devices 108 may also allow the operators 104 to create notifications, such as to indicate that a task needs to be performed. For example, the operator 104-2 may observe that a trash receptacle 148 is full or nearly full. The operator 104-2 may be unable to immediately address this situation, and may therefore use the wearable device 108-2 to indicate that the trash receptacle 148 needs to be emptied.

However in certain implementations, the wearable devices 108 may solely be focused on operation of the robots 100 and not other front-of-house operations (such as condiments/utensils, trash, and cleaning) or back-of-house operations (such as inventory). In fact, in certain implementations, notifications may be unidirectional. In other words, the robots 100 can create notifications but the operators 104 cannot create notifications.

In certain implementations, while the business 102 is operating and serving customers, the wearable devices 108 may be the sole HMI to the robots 100 with limited exceptions. These exceptions may include a backup hard-wired interface 152 (such as an Ethernet-connected laptop) for use when the wireless access point 124 is not functioning correctly.

The other exceptions to the sole HMI may be safety-related sensors and inputs, which may be required for certification or for UL (formerly, Underwriters Laboratories) listing. For example, access doors on the robot 100-1 may allow access to moving parts or high-voltage. When an access door is opened, the robot 100-1 may power down and/or halt operation of components located behind the access door. In addition, the robot 100-1 may raise a notification in response to opening of the access door. The robot 100-1 may self-clear the notification in response to the access door being closed.

These limited exceptions aside, using the wearable devices 108 as the sole HMI permits much greater mobility and flexibility for the operators 104. In addition, the data collected by the wearable devices 108 may be more closely tied to the notifications from the interface system 120 because there are no side channels for communication between the operators 104 and the robots 100.

Location of the operators 104 may be tracked by the wearable devices 108, such as using GPS or triangulation of wireless signals, such as wireless access points. Even more granular location data may be obtained by a positive identification of a specific feature by wearable devices. For example, the operator 104-1 may scan a bar code (or QR code) using the wearable device 108-1 to signal that the operator 104-1 is at a particular location and ready to perform a task. For example, the robot 100-1 may open an access door and cease operation when the operator 104-1 scans a particular QR code or uses the wearable device 108-1 to engage with a radio frequency identification (RFID) tag.

In addition to location, the wearable devices 108 may also include physiological sensors, such as heart rate, skin moisture levels, muscle activation, and acceleration. Acceleration may be used to identify and improve repetitive tasks. For example, a task that involves repetitive motion may be simplified, distributed among multiple operators, and/or automated to avoid repetitive motion.

Certain activities, such as washing hands, are unavoidable. In such cases, handwashing for a predetermined period of time may actually be monitored and verified by the wearable devices 108. As an example only, a handwashing station 156 may be associated with a short range wireless beacon 160. The wireless beacon 160 allows a wearable device, such as the wearable device 108-2, to recognize a close proximity to the handwashing station 156. The wearable device 108-2 may then log accelerometer activity associated with the handwashing station 156. Sufficient handwashing can then be identified based on accelerometer data in proximity to the handwashing station 156.

In other implementations, water temperature may be sent to the handwashing station 156 and the required handwashing time may begin once the water reaches a predetermined temperature. The wearable device 108-2 may signal (using a visual, audible, or vibratory output) that water has reached the necessary temperature. Then, the wearable device 108-2 can signal once a sufficient amount of time has been spent in handwashing. For example, the wearable device 108-2 may measure, using an accelerometer, whether the operator 104-2 is making a handwashing motion and only count the time during which the handwashing motion is being performed.

In other implementations, the wearable device 108-2 may simply count a predetermined period of time. The accelerometer activity may be analyzed later to determine whether the operator 104-2 spent the entire time washing their hands. By assisting the operators 104 regarding proper handwashing, the spread of foodborne illnesses can be substantially lessened.

In addition to assessing the sufficiency of operator action, such as handwashing, the interface system 120 may also generate notifications indicating that handwashing must be performed following certain activities, such as handling raw meat or visiting the bathroom. For example, the interface system 120 may not present any other alerts to the operator until handwashing is performed.

To protect privacy interests of the operators 104, a wireless beacon 164 may be located at a bathroom entrance 168 or within the bathroom itself. Tracking by the wearable devices 108 may therefore be disabled on the other side of the bathroom entrance 168. In addition, notifications may be paused so that the operators 104 are not tempted to check their wearable devices 108 while in the bathroom. Tracking may also be disabled when the operators 104 are engaged in any other personal time, such as breaks. Therefore, the wearable devices 108 may only transmit the handwashing motion of the operators 104 from the handwashing station 156 located outside the bathroom entrance 168.

The wearable devices 108 may be used to signal to the interface system 120 that the operators 104 are ready to take a break and that the operators 104 are ready to resume work. In one example, the interface system 120 may generate a notification indicating that a break period has arrived for the operator 104-2. The operator 104-2 may then, after evaluating the current state of the business 102 as well as any other notifications, begin the break the same way any other task may be claimed or acted upon from the wearable device 108-2. When an operator is unavailable, such as while in the bathroom or on break, the roles of the other ones of the operators 104 may shift to account for the unavailability of the other operator. For example, the role of the unavailable operator may be reassigned to another operator or distributed among multiple others of the operators.

In implementations where the interface system 120 is not restricted to interactions with the robots 100, the interface system 120 may also provide notifications to the wearable devices 108 related to various front-of-house and/or back-of-house activities. For example, a camera 172 may have a field-of-view of tables 176-1 . . . 176-P (collectively, tables 176). Periodically, the camera 172 transmits images of the tables 176 to the interface system 120. The interface system 120, or the remote support system 192 (which may have greater processing resources), uses machine vision techniques to determine cleanliness of the tables 176.

In response to determining that a customer is not seated at one of the tables 176 and yet the tables 176 are not clear, the interface system 120 may generate a notification indicating the need for cleaning the tables 176. Similar machine vision techniques may be applied to other surfaces that may need cleaning, such as counters, drink dispensers, and glass (including doors, windows, and viewing portals into the robots 100).

The inventory sensors 136 may include cameras, scales, and RFID readers. An inventory system 180 may determine the presence of certain inventory items based on input from the inventory sensors 136. In response to determining that inventory of a particular item is low, the interface system 120 may transmit the notification to one of the operators 104 indicating that an order should be placed. In other implementations, the interface system 120 may generate a notification indicating that a manual inventory inspection is needed. Upon completion of the manual inventory inspection, the interface system 120 may proceed with ordering the item.

The inventory system 180 may also determine whether certain items are in longer term storage, such as a freezer, and determine when those items should be added to a primary storage, such as a refrigerator or counter. For example, if a frozen ingredient needs to thaw, the interface system 120 may generate a notification indicating that the item needs to be removed from the freezer.

The inventory system 180 may know which ingredients are loaded in which of the robots 100 and may adjust which ingredients are provided to each of the robots 100, such as by restricting a certain ingredient to a single one of the robots 100 when a level of that ingredient is depleted.

The inventory system 180 may also track ingredient waste. For example, the inventory system 180 may correlate the number of raw ingredients that are provided to the robots 100 in comparison to the number of dispensed cycles of that ingredient from the ordering system 184. As an example, certain varietals or suppliers of onion may lead to greater or fewer number of successful dispense cycles per pound of onions.

Further, when preparing food, the operators 104 may have different preparation approaches that lead to more or less efficient usage of the ingredient. For example, operators that appear to create more food waste by decreasing the percentage of ratio of dispensed cycles to raw ingredient may receive training on more efficient processing, such as slicing out blemishes more precisely. In one refinement, as the stock in a particular ingredient gets lower, food preparation tasks may be assigned to those operators who appear to have the greatest efficiency in preparation.

The inventory system 180 may specify items in precise quantities to facilitate tracking. For example, when one of the operators 104 refills ketchup packets, instead of grabbing a handful of ketchup packets, there may be a predetermined number of pre-bundled ketchup packets. The inventory system 180 then correlates the number of bundles of ketchup packets with orders from the ordering system 184. Over time, an estimation of usage of ketchup packets can be inferred from orders. For example, ketchup packets may be reserved for take-out orders and therefore dine-in orders can be excluded from this analysis.

When the orders from the ordering system 184 indicate that a certain number of ketchup packets has likely been provided to customers, the interface system 120 can signal to the operators 104 to retrieve one or more bundles of packets from the inventory system 180. If the inventory system 180 recognizes that bundles of ketchup packets are generally retrieved two at a time or three at a time, the inventory system 180 may adjust the ketchup packet order to request different bundle sizes from the supplier.

An ordering system 184 receives and tracks orders made by customers. For example, customers may place an order using an ordering terminal 188, which may take the form of a phone, tablet, or kiosk. In addition, the ordering system 184 may receive orders via the distributed communications system 144 from user devices, such as phones, laptops, and tablets. If the ordering terminal 188 identifies that the customer may be experiencing difficulty with ordering, such as if a single screen remains in the foreground for longer than a predetermined period of time, the interface system 120 may generate a notification directed to the concierge role to assist the customer.

The ordering system 184 interfaces with the robots 100 to produce the ordered food. When certain food items are not produced by the robots 100, the interface system 120 may generate a notification that a food item needs to be manually prepared. For example, if the robots 100 are configured to make sandwiches (such as hamburgers), then filling drinks, and cooking french fries may be performed by the operators 104. In such cases, the ordering system 184 may communicate to the interface system 120 that the notification should be generated indicating the need for food preparation.

The ordering system 184 may use historical data and immediate data to predict how much of a particular food needs to be created. This reduces waste, such as by not cooking too many baskets of french fries. Additionally, the ordering system 184 may be able to reduce order times by predicting that additional baskets of french fries should be cooked and instructing the interface system 120 to generate such notification in advance of the demand.

The trash receptacle 148 may include a sensor, such as an optical or ultrasound sensor that determines when a level of trash in the trash receptacle 148 has reached a point where the trash receptacle 148 should be emptied. For example only, a low-priority notification may be generated when the trash receptacle 148 is approaching full, and a higher priority notification may take its place once the trash receptacle 148 is completely full.

In some implementations, the trash level in the trash receptacle 148 may be determined open loop, without any sensors directly measuring the trash receptacle 148. For example, the ordering system 184 may be programmed with how much trash generally results from each order produced. This information can be combined with how many of the orders are specified as dine-in compared to take-out. The amount of trash contributed by each dine-in customer then accumulates until the level reaches a capacity of the trash receptacle 148. The interface system 120 may recognize that there is a delay between generation of items that may end up in the trash (such as wrappers) and the time at which those items are actually placed in the trash receptacle 148. Therefore, the estimate may be time-delayed to better estimate the actual level of the trash receptacle 148.

The interface system 120 generates a notification when the estimated level reaches a predetermined threshold. Once one of the operators 104 clears that notification, indicating that the trash receptacle 148 was emptied, the open-loop algorithm returns to zero and begins accumulating expected trash.

The loop may be partially closed by requesting that the operators 104 report on the level of trash in the trash receptacle 148. For example, if a notification has been generated by the trash receptacle 148, and the operator 104-1 has emptied the trash receptacle 148, the wearable device 108-1 may query the operator 104-1 about the level of trash. The operator 104-1 can then use the wearable device 108-1 to indicate the level of trash that was found in the trash receptacle 148. For example, the wearable device 108-1 may have a mechanical or touchscreen dial that the operator 104-1 can use to provide an estimate of the fullness level of the trash receptacle 148 prior to emptying. This level can then be used as feedback to tune the trash volume algorithm.

Further, it is likely that more trash receptacles than simply the trash receptacle 148 will be present. An initial assumption may be that trash will be evenly distributed among the trash receptacles, and this assumption can be updated over time based on feedback from the operators 104.

While not shown, similar algorithms can be used for other service items, such as napkins, straws, and glasses. In one example, if purchased drinks are known by the ordering system 184 but water is not recorded by the ordering system 184, the interface system 120 may estimate the number of water glasses that will be obtained by customers. For example, a ratio of number of dine-in items (such as sandwiches) to number of drinks may be preprogrammed. For example, the number of drinks to sandwiches may be empirically determined over time to be 10:9.

Based on the number of sandwiches produced, the interface system 120 can estimate the number of drinks that will be consumed. The ordering system 184 can supply information about how many drinks were purchased and the difference between the purchased drinks and expected drinks can be used as the estimate for the number of water glasses used by customers. This analysis can then be used to generate a notification when the number of water glasses is estimated to be running low. As with the trash receptacle 148, the operators 104 may be prompted when refilling glasses to indicate how many glasses remained at the time of the refill.

Described in more detail below, the interface system 120 may allow the operators 104 more autonomy and flexibility, essentially allowing the operators 104 to self-manage. The operators 104 can claim tasks based on their expertise, location, and assessment of the state of the business 102. Meanwhile, notifications from the interface system 120 remain active so that tasks are not forgotten. Over time, lower priority notifications may be promoted to higher priority notifications. For example, a task that may be low priority but is ignored for a period of time may increase in priority.

Beyond using wearable devices 108 to signal intended completion and actual completion of tasks, the operators 104 may use the wearable devices 108 to review instructions for performing tasks, such as maintenance and reloading of ingredients in the robot 100 or power-on, shutdown, and maintenance procedures.

Instructions may be stored in memory on the wearable devices 108 or may be obtained on demand from the interface system 120. The level of instruction may vary based on the experience level of the operators 104. For example, more verbose instructions may be presented when the operator is newer or has completed the task fewer times. Instructions may be supplemented by photos and/or videos.

Further, support may be available from a remote support system 192. An operator may access the remote support system 192 when performing a new task or if an unexpected issue arises. In various implementations, the remote support system 192 may be able to access status information from the robots 100 as well as access cameras, such as the camera 172. In addition, the operators may have a camera, such as installed in a wearable device or a mobile device, to provide a video link to the remote support system 192. When multiple businesses including the business 102 are operating, a single set of operators at the remote support system 192 may be able to support all of the businesses.

The robots 100 may request notifications from the interface system 120 not just when an action needs to be performed for the robots 100 but when the robots 100 require state information. For example, there may be parameters of the robots 100 that are difficult to measure or for which sensors are unreliable or expensive. The robots 100 may then periodically, or whenever the information is needed, generate notifications requesting that the operators 104 make the measurements or assessments.

For example, the measurement may simply be a go or no-go decision, and clearing the notification is sufficient to allow the robots to proceed. In other implementations for other measurements, however, a value may be provided via the wearable device back to the robots 100. This manual feedback may also be used in the case of a failure of the sensor. While waiting for replacement of the sensor or development of a more robust sensor, the measurement may be performed manually by the operators 104.

For example, upon first starting up (such as after an evening of an activity), the robots 100 may generate notifications requesting that the operators 104 return components of the robots 100 to known positions. The operators 104 may also assist the robots 100 in calibrating sensors, such as by rotating a moving piece through its full range of motion. If manual measurement occupies too much time, sensors and/or other sensing methods may be developed to increase the efficiency of the business 102.

The interface system 120 may track which tasks are performed by which of the operators 104 in which roles. The interface system 120, in combination with the remote analytics system 140, may determine which groupings of tasks are performed by each role. Roles may be reassigned depending on the actual grouping of tasks. Further, tasks may be distributed and/or re-prioritized based on an assessment that some roles are less busy than others.

For a given task, performance of the operators 104 can be assessed. For example, the time between claiming a task and completing the task may be assessed to determine efficiency. In other situations, the interface system 120 may be able to determine the amount of time between beginning a task (regardless of when or whether the task was claimed) and completing the task (even if there is some delay until the operator actually indicates the task as cleared). If the efficiency for a particular operator is low, additional training can be provided to that operator.

In various implementations, a task may be directed to operators who perform the task more efficiently, such as by increasing the priority of the notification transmitted to other operators. The operators 104 may also be assessed based on whether a notification is generated soon after the indicated completion. For example, if an operator only partially cleans a portion of the robot 100-1, the robot 100-1 may more quickly issue the next notification indicating a need for cleaning. Reactivation of certain notifications within a short period of time may be an indication of incomplete performance of the task. Again, proper training can be offered in person or via the remote support system 192 to an operator whose performance seems suboptimal.

To improve the flexibility of scheduling and the work experience of the operators 104, cross training the operators 104 on different tasks may be prioritized. For example, if the operator 104-1 has not performed a certain task, that task may be sent to the corresponding wearable device 108-1 with a high priority to encourage the operator 104-1 to perform that task. In various implementations, the interface system 120 may communicate with the ordering system 184 to identify periods of time where the business 102 is less busy and suspected to remain less busy. At these times, task cross-training can be heightened. Meanwhile, at times when the business 102 is busy, the interface system 120 may direct tasks to operators according to their efficiency in completing those particular tasks.

In implementations where physiological data is measured by the wearable devices 108, this data can be used to determine which tasks are stressful for the operators 104. The tasks may then be investigated to determine whether they could be made less stressful. In addition, they can be distributed more widely across the operators 104 to reduce the overall stress for the operators 104. In some implementations, a rapid increase in the stress level (which may be indicated by elevated heart rate and increased perspiration) across multiple of the operators 104 may indicate a potential safety issue. Identification of the potential safety issue may automatically activate the remote support system 192. Staff of the remote support system 192 may then analyze the business 102 to assess whether there are any safety issues, such as a customer experiencing a medical issue or a crime in progress.

The wearable devices 108 may also control access to the business 102 or specific locations of the business. For example, the wearable devices 108 may be used as access control to a front entrance of the business 102 as well as to restricted areas of the business 102. The operators 104 may authenticate to the wearable devices 108, such as using biometric identifiers, to ensure that the wearable devices 108 are under the control of the respective operators 104. The wearable devices 108 may also be used to unlock certain areas only at certain times, such as when a pending notification is present. When the operators 104 are not permitted to access certain types or locations of inventory without a corresponding notification from the interface system 120, inventory shrinkage may be reduced.

Through the ordering terminal 188 or through personal electronic devices, customers may be able to reserve tables for specific times. The operators 104 may then be notified of the times when customers are arriving and may be notified just prior to their arrival to clear and clean tables. In addition, the interface system 120 may indicate the names of the customers to facilitate greeting of the customers.

As part of commissioning the business 102, the interface system 120 may present a graphical user interface so that consultants can describe the layout of the store and denote where all items are positioned. The interface system 120 may then determine the most efficient paths to guide new operators when performing tasks. The interface system 120 may also use the layout of the business 102 to determine how to assign tasks and how to assign roles. By providing varying instructions to the operators 104 for the same task, AB testing can be performed by the interface system 120.

While the robots 100 are described below as being the source of notifications, notifications may arrive from various other sources, such as the remote support system 192. For example, representatives at the remote support system 192 may periodically check on the business 102 and provide notifications based on an assessment of the business 102.

The ordering system 184 submits order data to a robot controller 200 of the robot 100-1 and to the robot 100-2. The robot controller 200 controls subsystems 204-1, 204-2, . . . 204-Q (collectively, subsystems 204). The ordering system 184 may select the robot 100-1 or the robot 100-2 for a particular menu item based on ingredients located in the robots 100. For example, a menu item may require ingredients not present in the robot 100-2 and therefore the ordering system 184 will direct that item to the robot 100-1. The ordering system 184 may use remote procedure call (RPC) for providing order data to the robot controller 200. The robot controller 200 may use RPC to update the ordering system 184 regarding order status. As one example, the RPC framework may be implemented using Thrift from the Apache Software Foundation.

Figure 2:
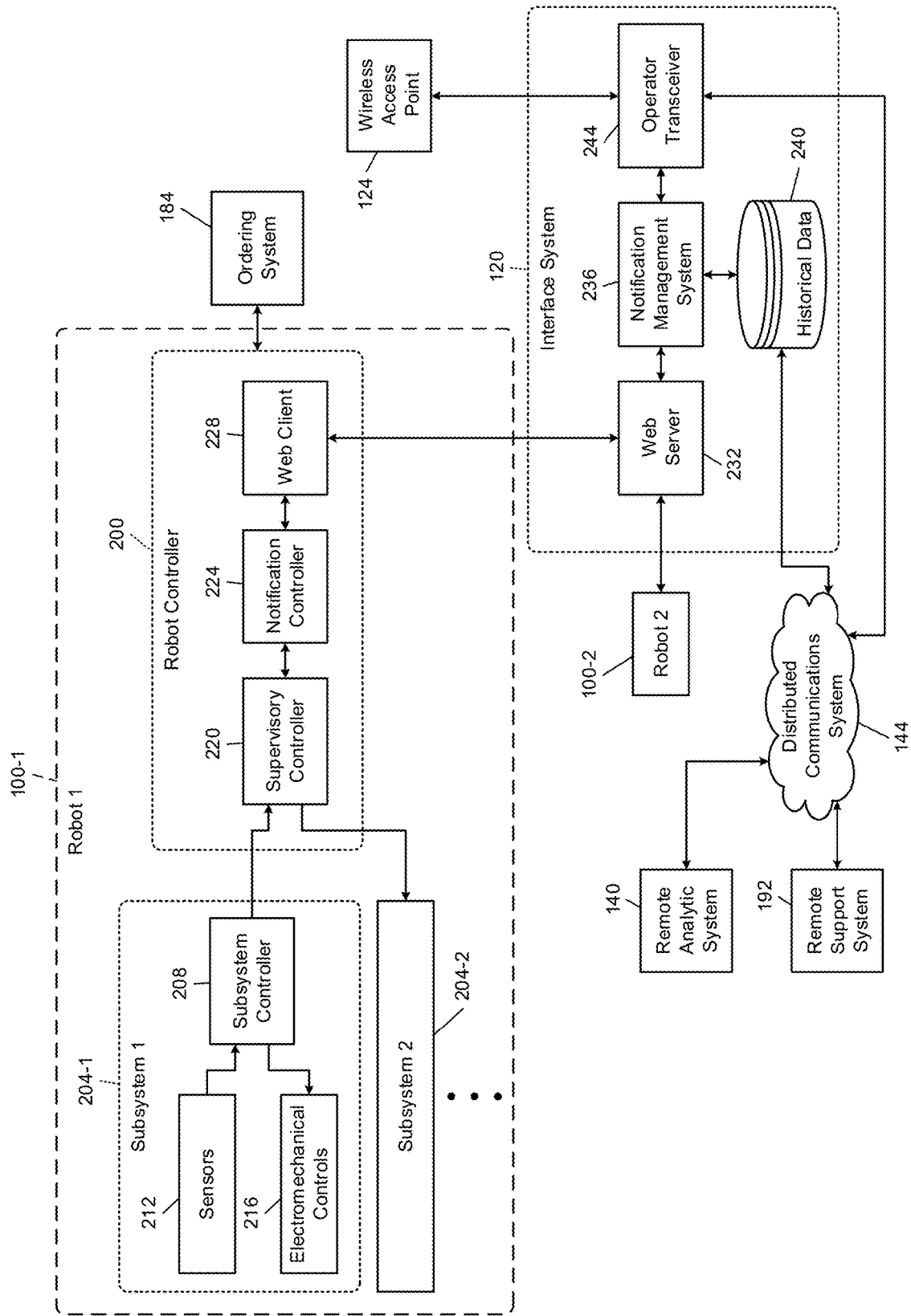
FIG. 2 is a functional block diagram of an example implementation of the interface system and a robot of FIG. 1.

In FIG. 2, more details of the robot controller 200 and the interface system 120 are shown. In addition, example simplified components of a first subsystem 204-1 are shown. The first subsystem 204-1 is functionally shown with a subsystem controller 208 that receives input from sensors 212 and actuates electromechanical controls 216. For example, the electromechanical controls 216 may include gear drives for a conveyor, pistons for a slicer, a motor for a grinder, etc. The sensors 212 may include optical sensors that determine the presence of items such as sandwich buns and cooking grease.

The subsystem controller 208 and the remaining ones of the subsystems 204 communicate with a supervisory controller 220 of the robot controller 200. The supervisory controller 220 controls the subsystems 204 in concert to produce items commanded by the ordering system 184 of FIG. 1.

The robot controller 200 may include two network interfaces corresponding to separate physical networking ports. One networking port may be for a local area network of the robot 100-1, which is not routable outside of the robot 100-1. This local area network allows communication between the subsystems 204 and the robot controller 200. That network may not be routable outside of the robot 100-1. The robot controller 200 therefore implements a second network interface and a second networking port that is able to interact with outside entities, such as the ordering system 184 and the interface system 120.

The robot controller 200 may operate a full network stack to allow communication between the robot controller 200 and each of the subsystems 204. For example, the robot controller 200 may implement dynamic host configuration protocol (DHCP), domain name system (DNS) service, and a virtual private network (VPN) endpoint. Because the internal network for each of the robots 100 is separated, the address ranges may overlap, which simplifies network setup, especially as subsystems are moved among robots and facilities.

Although not shown for simplicity, the robot controller 200 may communicate with the ordering system 184 and the interface system 120 via networking switches within a local area network (LAN). Although described as physically separated, the subsystems 204 of the robot 100-1 may alternatively be permitted to communicate with entities outside of the robot 100-1. In other implementations, a switch (not shown) may be configured to assign each of the robots 100 to a respective virtual local area network (VLAN). In other words, the subsystems 204 and the internal network interface of the robot controller 200 are on a VLAN isolated from any other network endpoints.

The supervisory controller 220 may indicate to a notification controller 224 that a notification is required. The notification controller 224 may then set notifications in the interface system 120. For example, the notification controller 224 may use a web client (which may simply be implemented as a text-based library with no graphical display capability) to submit and retrieve data from a web server 232 of the interface system 120. In various implementations, the notifications may flow in one direction—that is, from the robots 100 to the interface system 120.

Notifications received by the web server 232 may be tracked by a notification management system 236. Historical data about notifications, including information about which operators handled the notifications and how long certain notifications took to complete, is stored into a historical data store 240. An operator transceiver 244 provides communication between the notification management system 236 and the wearable devices 108. As examples, the operator transceiver 244 may transmit signals using the wireless access point 124 as well as the distributed communications system 144.

When the robot 100-1 transmits a notification to the interface system 120, the notification may be tagged with the identity of the robot 100-1. In other implementations, the interface system 120 may recognize that the notification was sent by the robot 100-1 (such as based on the source IP address) and therefore tracks notifications separately for each of the robots 100. In various implementations, the subsystems 204 of the robot 100-1 may each have their own unique identifier. In this way, the names of the notifications may overlap across the subsystems 204 without those notifications becoming ambiguous.

When the subsystem controller 208 transmits notification to the notification controller 224, the notification may include an identifier of the subsystem 204-1. In other implementations, the notification controller 224 may tag the notification with an identifier corresponding to the first subsystem 204-1, which may be performed based on recognizing the source IP address as being associated with the first subsystem 204-1.

Then, every notification managed by the notification management system 236 is associated with a specific one of the robots 100 as well as a specific subsystem within the robot. In order to ensure that the interface system 120 has the same set of notifications as the robots 100, the robots 100 may provide a full set of notifications to the interface system 120 upon power-on.

For example only, the notification controller 224 may assemble a list of permitted notifications by receiving those notifications from each of the subsystems 204. In other words, each of the subsystems 204 may have its own set of notifications that are provided on power-up to the notification controller 224. This allows for the subsystems 204 to be interchanged, such as between the robots 100, or replaced without having to reconfigure the notification controller 224. The notification controller 224 may combine notifications from the subsystems 204 with notifications general to the supervisory controller 220 and provide the entire set of notifications to the interface system 120. As each of the robots 100 comes online and connects to the interface system 120, a notification library is updated to store valid notifications for each of the robots 100. This library is then referenced when notifications arrive from the robots 100.

Notifications

As one simple example, an excerpt of a notification library 260 is shown in FIG. 3. While certain fields are shown for illustration, not all depicted fields are necessary and additional fields not shown may be incorporated. As long as the notification library 260 includes an identifier of notification source, and a code that allows unique identification of the notification, the extra fields may be unnecessary. The source field identifies the source of the notification, which may be one of the robots or may be another source of notifications, such as the inventory system 180 or the remote support system 192. The notification library 260 also includes a sub-source indicating the subsystem within the robot from which the notification will be raised.

The notification code field is unique within a specific subsystem. In other words, the subsystem will only have one notification code 1a. However, that notification code may be reused by a different subsystem. In this way, the subsystems can each implement their own set of notification codes without having to coordinate with all other subsystems. This also allows multiple instances of the same subsystem to be used in a single robot. For example, a topping module may be a subsystem and there may be multiple topping modules in one robot to allow for multiple toppings to be dispensed from that robot. Note that notification code 1a is defined by the bun subsystem as a reload buns notification and is reused by the cooker subsystem to indicate the need to empty a grease trap.

The notification library 260 includes an optional priority field for each notification, which may be set by the subsystem. In this example, lower numbers correspond to higher (more urgent or important) priority. An optional "Clear Authority" field indicates which entities can clear a notification once notification is raised. This may specify either or both of the robot or the operator. In some situations, the notification can only be cleared by a representative at the remote support system 192. An optional "Recipients" field may specify which operators can receive the notification by role. For example, some notifications may be specific to the concierge role.

An optional "Clear on Clear" field may be implemented to indicate that clearing the notification should result in clearing other notifications. Those other notifications may be provided in list format. In the example of FIG. 3, the notification library 260 has the empty set for each notification (meaning that no notifications are automatically cleared in response to a clear event).

An optional "Clear on Raise" field indicates that other notifications should be cleared when a notification is raised. Again, this field may be in the form of a list. As one example, when the reload buns now (1b) notification from the bun subsystem is raised, notification code 1a will be cleared. Note that in this implementation, the notifications that are cleared are within the same subsystem. In this way, only "1a" is specified in the list, indicating which notification within the bun subsystem will be cleared when notification 1b is raised.

For illustration only, a few additional notifications relevant to certain configurations of a food processing robot (and particularly, a robot that creates hamburgers) are described. For example, in the bun subsystem, a "Clean Bun" notification may be defined. The "Clean Bun" notification may be raised when a failed bun dispense occurs. This may include a partial dispense, a double dispense, or no dispense. The operator may be instructed to remove an access cover and remove any buns before placing the cover and clearing the notification. Upon the notification being cleared, the bun subsystem may then attempt to dispense again.

If the bun subsystem detects another failed dispense after the notification is cleared, the bun subsystem may raise the notification again. As described above, if these re-raising events are common for a particular operator, additional training can be provided to that operator. Further, bun subsystem notifications may be directed to operators having greater effectiveness at times of high activity.

For a conveyor subsystem that moves a sandwich carrier along from one station to another, a home notification, a "Home after Jam" notification, and a "Continue after Jam" notification may be defined. The home notification is raised when the conveyor subsystem determines the need to cycle through its range of motion and establish a home position. For example, this may allow a linear encoder or rotary encoder to be zeroed and may allow the conveyor to bring each of its components to a known starting state. The operator is instructed to clear everything from on the conveyor before clearing the notification. Once the home notification is cleared, the conveyor will commence the homing process.

The "Home after Jam" notification is raised when a jam occurs in a section of the conveyor subsystem. The notification instructs the operator to remove any items (such as a sandwich carriers) from the affected segment of the conveyor subsystem. Once the notification is cleared, the conveyor will commence homing the jammed segment. The "Continue after Jam" notification is raised once the conveyor finishes homing a conveyor subsystem segment following a jam. In response to the "Continue after Jam" notification, the operator can replace items onto the conveyor to allow the conveyor to continue its operation. By clearing the "Continue after Jam" notification, the conveyor subsystem will return to normal operation.

A topping slicing subsystem may define a home notification and a reload notification. The home notification is raised when the slicing subsystem needs to return to a known operating state. When a topping is present in the toppings subsystem, the operator may be instructed to place a receptacle underneath the slicing subsystem to catch any food debris resulting from the homing process. The operator can clear the notification once the receptacle is positioned to catch the food debris. The reload notification is raised when the slicing subsystem detects that the ingredient level is low enough to necessitate a reload.

A cooker subsystem may define a grease level notification. The grease level notification may be raised based on open-loop estimation. For example, the amount of grease released from each cooking event may be accumulated and once an estimate of the accumulated grease reaches a threshold, this notification is raised. In various implementations, this notification may be based on an estimate that takes into account which meat blend is being cooked. For example, a leaner meat will contribute less grease to the accumulated estimate.

The operator clears the notification once the grease trap is emptied. There may be two grease level notifications. The first is an indication that the grease level is estimated to be partway (for example, halfway) full and should be emptied. A second grease level notification indicates that the grease level is nearing full. Once this second grease level notification is raised, cooking operations may be suspended until the notification is cleared.

When the operator clears the grease trap, the operator may provide feedback on how full the grease trap was. For example, the grease trap may have graduated indicators, which the operator reads and inputs to the wearable device. With this feedback, the open-loop estimation of grease level can be adapted over time.

A box dispensing subsystem may define a reload notification that is raised when a sensor indicates the number of boxes remaining is low. When the notification is raised, the box dispensing subsystem may move to a reload position for easier access by the operator. Once the operator clears the notification, the box dispensing system may return to a dispense position and resume dispensing boxes for sandwiches.

Figure 4:
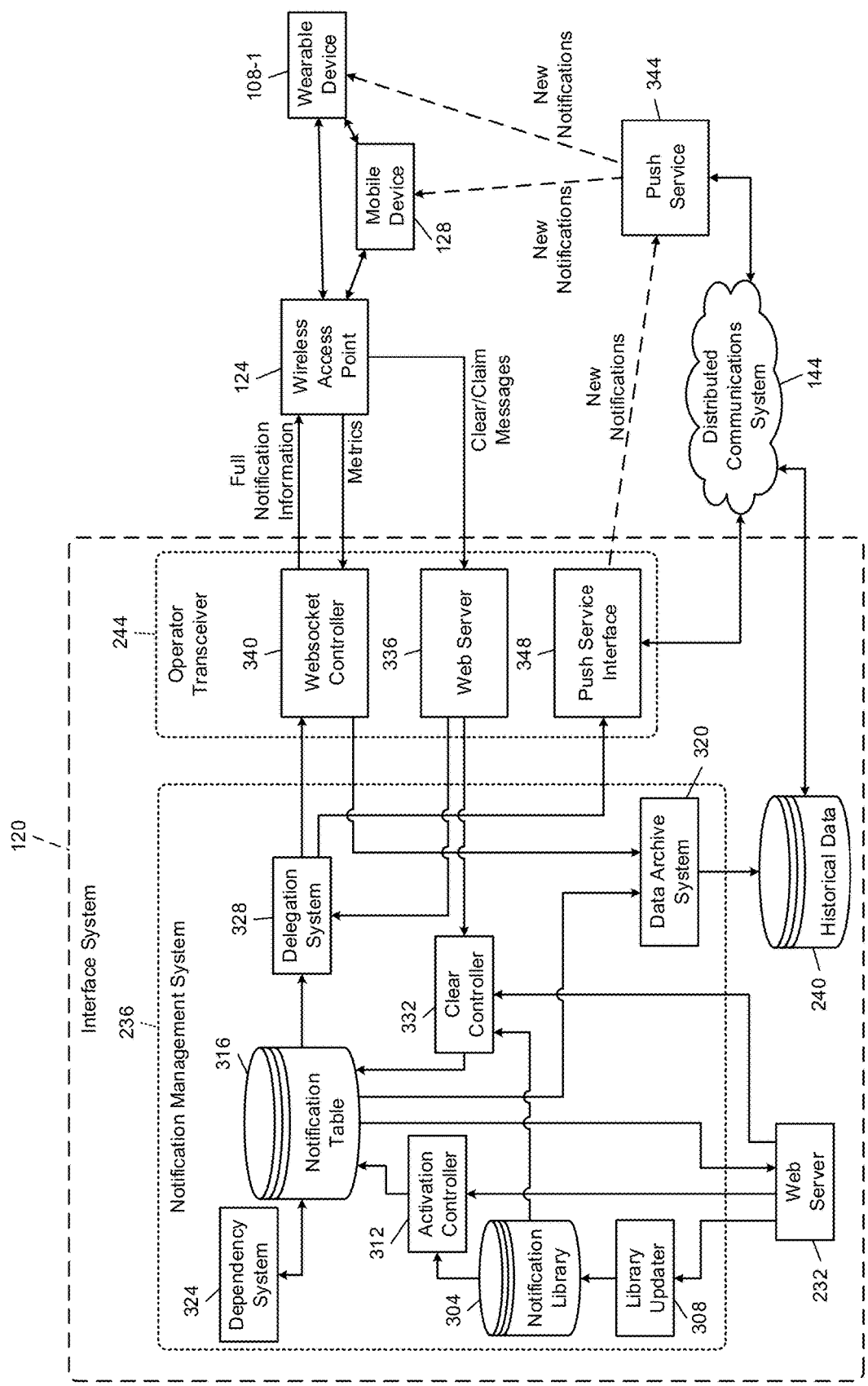
FIG. 4 is a functional block diagram of an example implementation of the interface system.

In FIG. 4, additional details of an example implementation of the interface system 120 are shown. The notification management system 236 includes a notification library data store 304, which stores a notification library, such as the notification library 260 shown in FIG. 3. A library updater module 308 receives notifications from each of the robots 100 via the web server 232. The library updater module 308 then updates the notification library data store 304.

The notification table 316 may include a field for each field shown in FIG. 3. In addition, the notification table 316 may include a field indicating status, which may be binary. The notification table 316 may also include a feedback field that provides feedback from the wearable devices 108. For example, the feedback field may record how full a grease trap was when the corresponding operator went to empty the grease trap. This feedback information may then be assessed by the remote analytic system 140 to update open-loop estimation of grease trap filling rates.

When a robot first provides a library to the library updater module 308 following power-on, the library updater module 308 first removes all notifications for that robot from the notification library data store 304 before placing the new notifications. In this way, stale notifications that are no longer supported by the robot will be removed from the notification library data store 304.

An activation controller 312 receives notification raise messages from the robots 100 via the web server 232. The activation controller 312 obtains a corresponding notification from the notification library data store 304 and enters that notification into a notification table 316 as an active notification. For example, the notification table 316 may include one row for each active notification and for each recently cleared notification. As recently cleared notifications are removed from the notification table 316, they may be stored into the historical data store 240 by a data archive system 320.

A dependency system 324 may monitor the notification table 316 so that when a notification is raised or cleared in the notification table 316, any other notifications that should be cleared are cleared in the notification table 316. The dependency system 324 relies on clear-on-clear and/or clear-on-raise fields from the notification library data store 304.

The notification table 316 may also include a field indicating whether the notification has been claimed by one of the operators 104. In other implementations, claim status for notifications is managed by a delegation system 328.

A clear controller 332 receives clear instructions from the web server 232 and clears the corresponding notifications in the notification table 316. For example, the robots 100 may clear certain notifications when sensors indicate that the notification has been acted upon. For example, a sensor is configured to detect the presence of buns. After determining that buns are missing, a bun refill notification may be raised; once the sensor recognizes that the buns have been replaced, the notification may be automatically cleared by the robot.

The clear controller 332 also receives clear messages from the wearable devices 108, such as via a web server 336 of the operator transceiver 244. In various implementations, the web server 336 and the web server 232 may be the same web server.

Block Diagrams

For illustration purposes, only the wearable device 108-1 of the mobile device 128 are shown in FIG. 4. The remaining wearable devices 108 will interact with the interface system 120 similarly. In various implementations, the mobile device 128 may be omitted and the wearable device 108-1 will interact with the interface system 120 independently.

The operator 104-1 uses the wearable device 108-1 to indicate that a notification (also referred to in this disclosure as a task) has been cleared. The operator 104-1 may also use the wearable device 108-1 to indicate that the operator 104-1 claims the task and intends to complete the task. These messages are transmitted to the web server 336 via the wireless access point 124. When a clear message is received, the web server 336 forwards the message to the clear controller 332 to clear the corresponding notification. When a claim message is received, the web server 336 forwards the claim message to the delegation system 328 to track who has claimed each notification.

The wearable device 108-1 may obtain a full set of active notifications relevant to the wearable device 108-1 from the operator transceiver 244, such as using a WebSocket interface as defined by RFC 6455. A WebSocket controller 340 of the operator transceiver 244 provides notification data to the wearable device 108-1 upon demand from the wearable device 108-1. The WebSocket controller 340 may also provide instruction data to the wearable device 108-1 to assist in the performance of the notifications. In other implementations, the wearable device 108-1 may be preprogrammed with the instructions or may download them on the fly over the distributed communications system 144. In still other implementations, the wearable device 108-1 may obtain instruction information from the mobile device 128, which will frequently have greater storage capacity than the wearable device 108-1.

Metrics from the wearable device 108-1 may also be pushed to the operator transceiver 244 via the WebSocket controller 340. For example, location and accelerometer data may be supplied to the WebSocket controller 340, which is then stored in the historical data store 240 by the data archive system 320.

The wearable device 108-1 may not always be active. In order to push notifications to the wearable device 108-1 when the wearable device 108-1 is not active, a push service may be used. A push service 344, such as the Apple Push Notification Service (APNS) from Apple Inc., may be a cloud service located remotely from the business 102 and accessible via the distributed communications system 144. While communication physically traverses the distributed communications system 144, dashed lines show the logical flow of data from the push service 344 to the mobile device 128 and the wearable device 108-1.

A push service interface 348 of the operator transceiver 244 provides notification data to the push service 344 for distribution to the mobile device 128 and the wearable device 108-1. The architecture of the wearable device 108-1 of the mobile device 128—that is, the operating system and firmware—may allow the push service 344 to activate the respective device with a new notification. Meanwhile, the WebSocket controller 340 may not be able to communicate with the mobile device 128 or the wearable device 108-1 unless the respective device is in an active state.

In other words, the push service interface 348 is used to send urgent notifications to the wearable device 108-1, while the WebSocket controller 340 provides activation notification information and potentially instruction data to the wearable device 108-1 upon request by the wearable device 108-1. The delegation system 328 may only use the push service interface 348 for high priority notifications. Lower priority notifications may wait until the wearable device 108-1 establishes a connection to the WebSocket controller 340.

Figure 5:
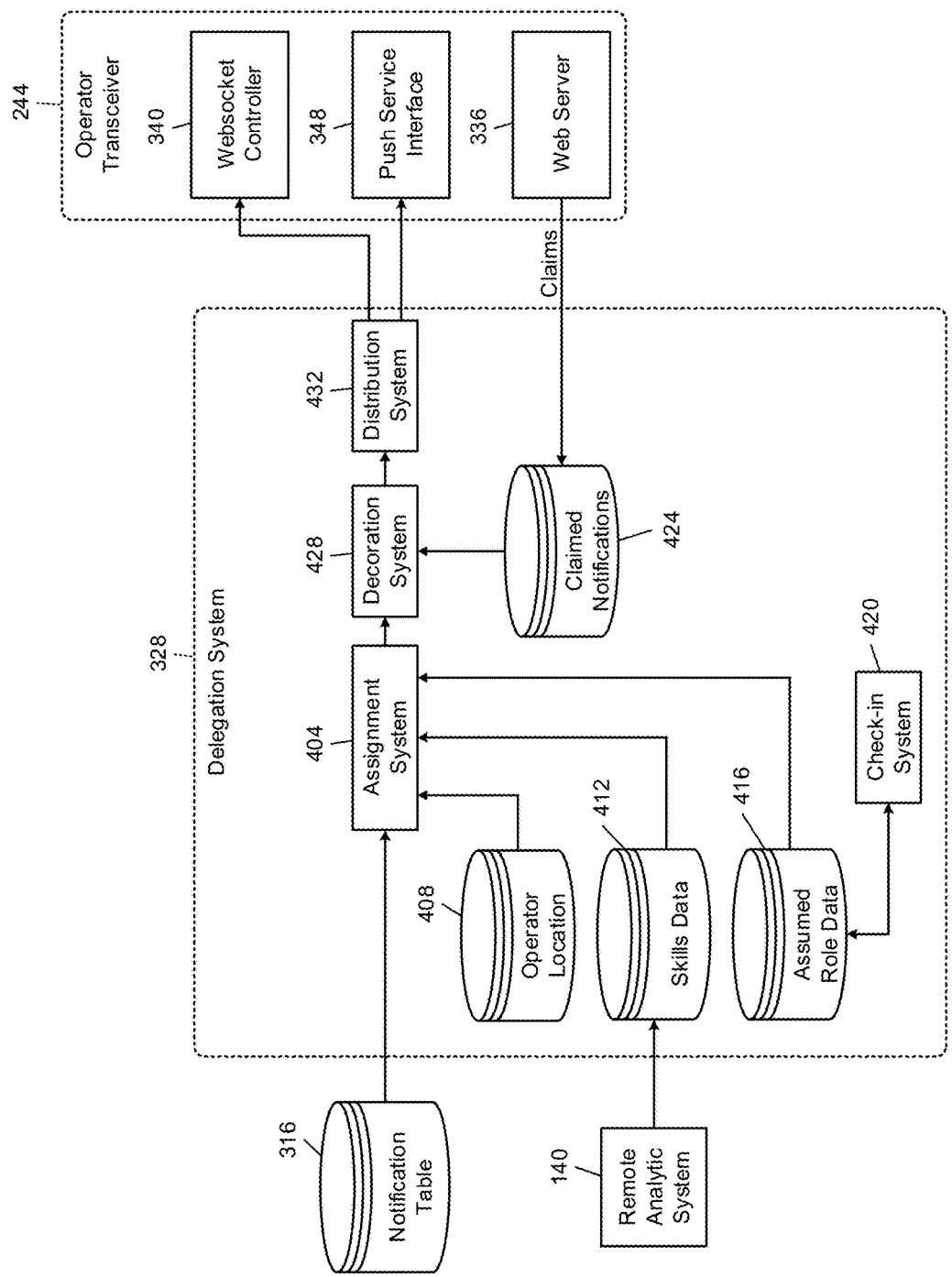
FIG. 5 is a functional block diagram of an example implementation of a delegation system of the interface system.

In FIG. 5, an example implementation of the delegation system 328 includes an assignment system 404, which determines to whom tasks from the notification table 316 should be assigned. The notification table 316 may include a field specifying recipients, which may limit which recipients the assignment system 404 can select from. The assignment system 404 may further narrow which operators will receive a task based on information such as location from an operator location data store 408, skills data from a skills data store 412, and role information from an assumed role data store 416.

The operator location data store 408 may be populated based on beacons within the business used to the track locations of the wearable devices 108. In other implementations, the wearable devices 108 may self-report their location to the operator location data store 408.

The skills data store 412 may track which skills have been developed by the operators and may also include information about how efficient operators are at those tasks. This information may be provided by the remote analytic system 140. As described above, the assignment system 404 may assign operators demonstrating low efficiency in skills to those skills during periods of downtime at the business 102.

The assumed role data store 416 establishes which roles operators are operating in. For example, a check-in system 420 may allow operators to select their own role upon checking in to work at the business 102. The assignment system 404 determines which of the operators 104 will receive each of the notifications and may also adjust priorities for each notification per each operator.

A claimed notifications data store 424 records which operators have claimed which notifications. The claimed notifications data store 424 may remove claims that are more than a certain predetermined amount of time old, such as five minutes. This may be based on the assumption that either the task is been completed or the claim to the task has not come to fruition.

A decoration system 428 applies metadata to each notification for each operator, such as to indicate that a task has been claimed. In addition, the decoration system 428 may adjust the metadata based on how long ago the task had been claimed. For example, as the task claim reaches the five minute mark, the associated metadata may decrease the strength of that claim. For example, the decoration system 428 may specify different colors to tasks based on whom those tasks were claimed by. The color may start to fade over time as the notification grows older with respect to the claim time.

For example, unclaimed notifications may initially be colored white. The decoration system 428 may color the notifications to a color responding to each operator and fade that color out over time back to white over a predetermined period of time (such as 10 minutes). The fade may be logarithmic such that the fade happens very slowly at the beginning of the period and much more quickly towards the end of the period.

A distribution system 432 is responsible for providing notifications to the wearable devices 108. The distribution system 432 may send urgent notifications to the push service interface 348 immediately. Meanwhile, lower priority notifications may remain in the distribution system 432 waiting to be obtained via the WebSocket controller 340. For medium priority notifications, the distribution system 432 may send these notifications via the push service interface 348 if the corresponding wearable device has not connected to the WebSocket controller 340 for longer than a predetermined period of time.

Figure 6:
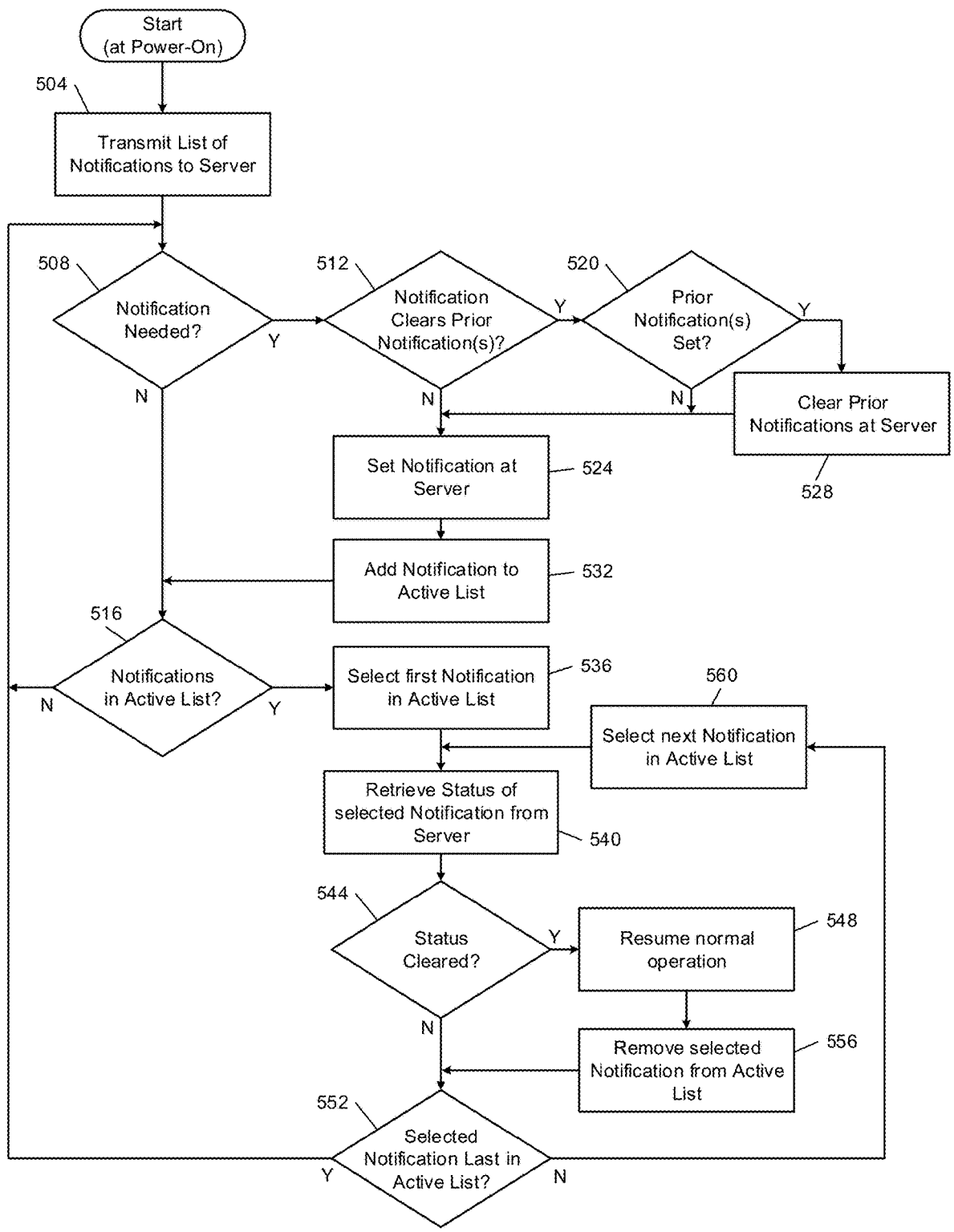
FIG. 6 is a flowchart of example operation of the robot notification controller of FIG. 2.

In FIG. 6, example notification operation of the notification controller 224 of FIG. 2 is presented. Control begins at power-on of the robot at 504. At 504, control transmits a list of valid notifications to the server using hypertext transfer protocol (HTTP). The list of notifications may be assembled from notifications supplied by subsystems of the robot. These subsystems may, at power on of the subsystem, transmit notifications to the notification controller, which assembles these notifications and incorporates overall robot notifications. For example only, the notifications from each of the subsystems may be received as a JavaScript Object Notation (JSON) text file. The notification controller may wrap each JSON text file in a tag indicating the subsystem from which the JSON text file was received and concatenate all of the wrapped files into a single JSON file for provision to the interface system.

The robot may explicitly request that the server delete all existing notifications for the robot so that stale notifications (such as for removed subsystems) are not in the library maintained by the interface system. In other implementations, the robot may rely on the interface system to ensure that stale notifications are not present. Control continues at 508.

If a new notification is needed at 508, control transfers to 512; otherwise, control transfers to 516. A notification may be needed in response to a notification being received from one of the subsystems. At 512, control determines whether the needed notification clears prior notifications. If so, control transfers to 520; otherwise, control transfers to 524.

This clear on raise behavior may be specified as part of the notifications from the robot controller from one of the subsystems. In other implementations, clear on raise may be handled by the interface system and omitted from the operation shown in FIG. 6. At 520, if any of the prior notifications that need to be cleared have been previously set (or, raised), control transfers to 528; otherwise, control transfers to 524. At 528, control clears prior notifications at the server, such as by using a PUT verb over HTTP. Control then continues at 524.

At 524, control sets the notification at the server, such as by sending a set command. For example, the set command may be transmitted using an HTTP POST verb. In other implementations, another communication protocol may be used, such as WebSocket or remote procedure call (RPC). At 532, control adds the notification to a list of active notifications. Control then continues at 516. Although not shown in FIG. 6, control may also handle notifications cleared by the robot. If a notification is cleared by the robot, control can send an HTTP POST command to the server to clear the notification. The notification would then be removed from the active list. Normal operation may have already resumed in response to the notification being cleared or the controller may confirm clearing of the notification allowing subsystems to resume normal operation.

At 516, control determines whether there are any notifications in the active list. If so, control transfers to 536; otherwise, control returns to 508. At 536, control selects the first notification in the active list and continues at 540. At 540, control retrieves the status of the selected notification from the server, such as by using an HTTP GET verb. At 544, control determines whether the retrieved status is the cleared status. If so, control transfers to 548; otherwise, control transfers to 552. At 548, control allows any subsystems waiting for that notification to be cleared to resume normal operation. Control continues at 556, where the selected notification is removed from the active list. Control continues at 552.

At 552, control determines whether the presently selected notification is the last-listed notification in the active list. If so, control returns to 508; otherwise, control transfers to 560 for another iteration. At 560, control selects the next notification in the active list and continues at 540. In other implementations, control may request a status of all active notifications instead of requesting each notification one at a time. In other implementations, control may simply request a status of all notifications, to which the server may reply with a list of notifications that have been raised for the server, indicating the status of each. In still other implementations, the server may respond with a list of recently cleared notifications.

In various implementations, control may be event-driven as opposed to using a polling loop. For example, the yes branch of 508 (beginning at 512) may be invoked in response to a subsystem or the supervisory controller identifying that a notification should be raised. Similarly, the yes branch of 516 (beginning at 536) may commence in response to a timer event. In other words, responding to new notifications as well as checking for existing active notifications may be performed in parallel.

UI State Diagram

Figure 7:
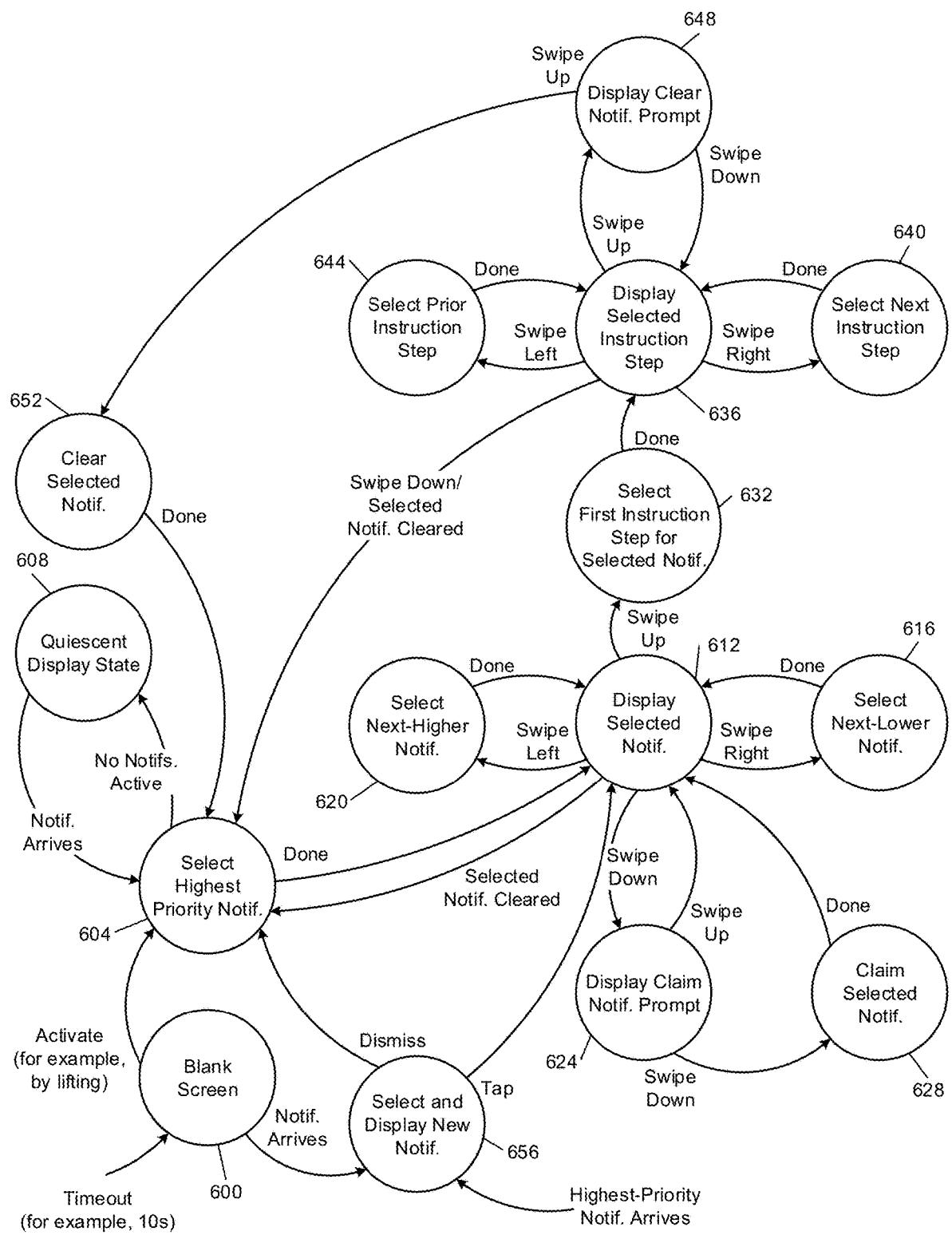
FIG. 7 is a state machine diagram of an example user interface for a wearable device.

In FIG. 7, a state diagram of an example implementation of a wearable device user interface is shown. A base state 600 where a blank screen is shown may be the default after a period of inactivity. For example, after 10 seconds of not interacting with the wearable device, the user interface may return to state 600. In addition, the wearable device may return to state 600 based on accelerometer data, such as if it appears the operator has lowered their arm.

In response to the wearable device being activated, such as by the operator lifting their arm, the wearable device transitions to state 604. At state 604, control selects the highest-priority notification. For example, this may require contacting the interface system via WebSocket and obtaining a list of currently pending notifications for the wearable device. The notifications may be tailored to the wearable device and may include information about the priority of the notifications as well as whether any of the notifications have been claimed and by whom. The notifications are ranked in order of priority and the notification having the highest priority is selected.

Once the highest priority notification is selected at state 604, the wearable device transitions to state 612. However, if no notifications are active, control transfers to state 608. At state 608, the wearable device displays a message indicating that no notifications are active. If a notification arrives, the wearable device transfers back to state 604.

At state 612, the wearable device displays the selected notification. In response to the operator swiping right, the wearable device transitions to state 616, where the next-lower notification is selected. Upon selection of the next-lower notification, the wearable device transitions back to state 612. If the operator swipes left at state 612, the wearable device transitions to state 620, where the wearable device selects the next-higher notification. Once the next-higher notification is selected, control transitions back to state 612.

If, at state 612, the user swipes down, the wearable device transitions to state 624. At state 624, the wearable device displays a prompt inviting the operator to claim the notification. For example, a button may be displayed to allow the notification to be claimed or a message may indicate that a swipe-down gesture will claim the notification. If the operator swipes down to claim the notification, the wearable device transitions to state 628; if the operator instead swipes up, wearable device returns to state 612.

At state 628, the wearable device claims the selected notification, such as by transmitting a claim message to the interface system, and may also update a color of the selected notification. Once the selected notification is claimed, the wearable device transitions back to state 612. When the operator uses the swipe-up gesture at state 612, the wearable device transitions to state 632. At state 632, the wearable device selects the first screen of instructions (for example, the first step) for the selected notification. Once selection is done, the wearable device transitions to state 636.

At state 636, control displays the selected instruction step to the operator. In response to a swipe-right gesture, the wearable device transitions to state 640, where the next instruction step is selected. If the currently selected instruction step is already the last instruction step, the selection remains unchanged. Once selection is complete, the wearable device returns to state 636.

In response to a swipe-left gesture from state 636, the wearable device transitions to state 644, where the prior instruction step is selected (or the first instruction step remains selected). When selection is done, the wearable device returns to state 636. While at state 636, if the operator swipes down or if the selected notification has been cleared (such as by the robot or by another operator), the wearable device transitions to state 604. If, at state 636, the operator swipes up, the wearable device transitions to state 648. At state 648, if the operator swipes down, the wearable device returns to state 636.

At state 648, the wearable device displays a prompt allowing the operator to clear the notification. For example, a button may be tapped to clear the notification or a swipe-up gesture may be used to clear the notification. The swipe-up gesture implementation is shown in FIG. 7. Therefore, if the operator swipes up while at state 648, the wearable device transitions to state 652. At state 652, the wearable device clears the selected notification, such as by transmitting a clear message to the interface system. Once the clear operation is done, the wearable device transitions to state 604. At state 612, if the displayed notification is cleared, the wearable device transitions to state 604 to select the current highest-priority notification.

At state 600, if a notification arrives, such as in response to a push notification, the wearable device transfers to state 656. At state 656, the wearable device selects and displays the new notification. In addition, the wearable device may provide an audio or vibratory output to notify the operator of the new notification. The operator can dismiss the new notification, such as by swiping down, in which case the wearable device transitions to state 604. If, at state 656, the operator instead taps the wearable device to indicate interest in the new notification, the wearable device transitions to state 612 (or may transition directly to state 632 to select the first instruction step for display).

In various implementations, a highest-priority notification causes the wearable device to display that notification regardless of the present state of the wearable device. For example, upon receiving a highest-priority notification, the wearable device may preserve the present state of the user interface and immediately transition to state 656. If the operator dismisses the highest-priority notification, the prior state of the user interface may be restored.

Figure 8:
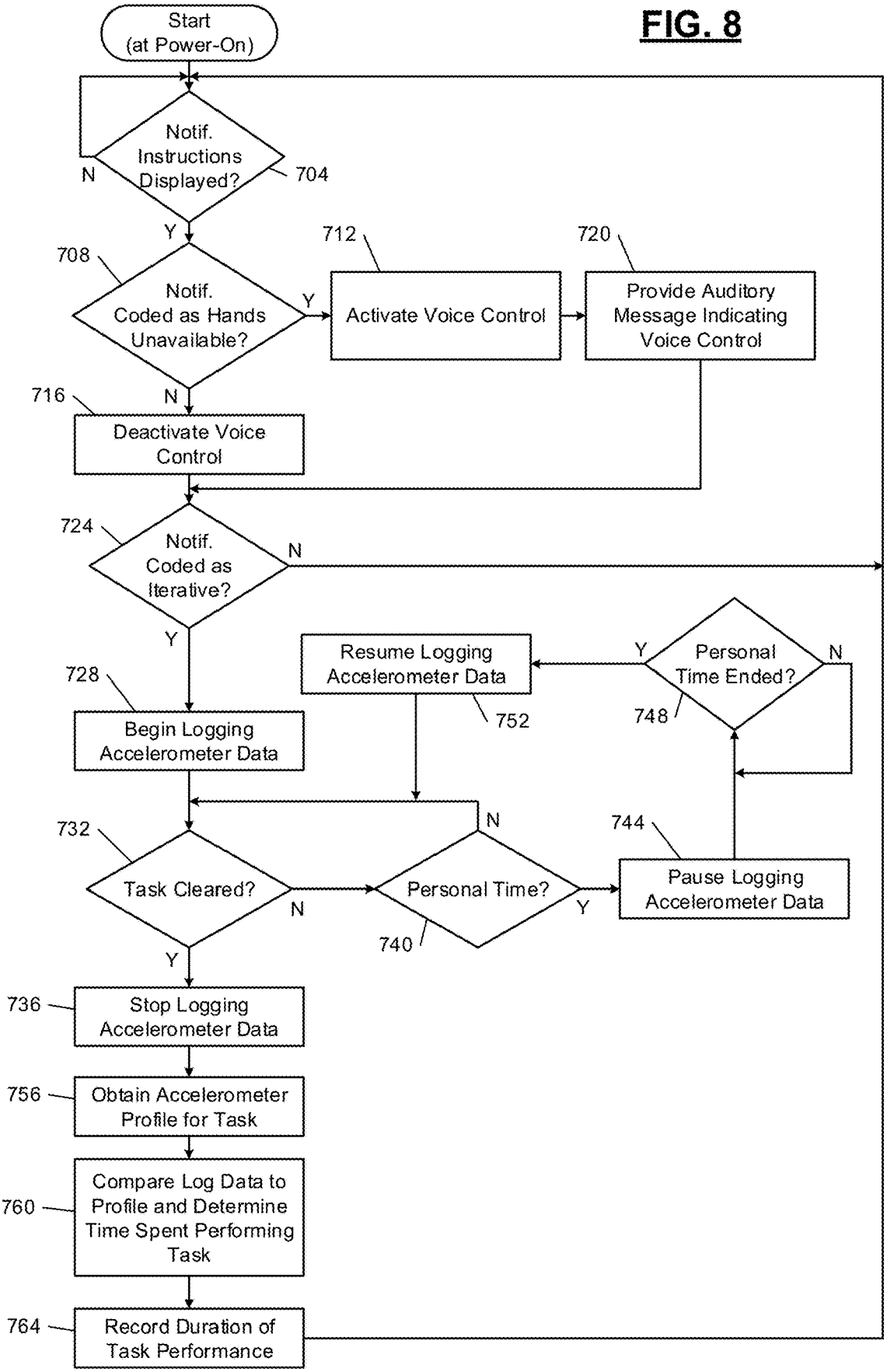
FIG. 8 is a flowchart of example supplemental operations of the wearable device.

In FIG. 8, examples of additional operation of the wearable device are shown. For example, voice control may be activated for certain notifications and accelerometer logging may be used for other notifications. In the depicted example, control begins at 704, where if notification instructions are displayed (indicating a user beginning to perform a task associated with the notification), control transfers to 708; otherwise, control remains at 704.

At 708, control determines whether the notification is coded as a hands-unavailable notification. If so, control transfers to 712; otherwise, control transfers to 716. For example, the notification may be coded as hands unavailable if the user's hand wearing the wearable device will be in a position making the display difficult to view by the operator or if the arm not wearing the wearable device is engaged in an activity making manipulation of the wearable device difficult.

In addition, the notification may be coded as hands-unavailable if the operator's hands may be unclean while performing the task. In various implementations, a task may be configured such that the hand of the user wearing the wearable device may get dirty while leaving the other hand clean and able to manipulate the wearable device. If the task is suitable for a specific (left or right) hand, whether the hand is unavailable may depend on whether the user is left-handed (and the wearable device worn on the right hand) or right-handed (and the wearable device one left-hand).

At 712, control activates voice control, which means that the text displayed on the wearable device may be read out loud and navigation commands may be read out loud. In addition, the wearable device may begin listening for voice input to navigate the user interface of the wearable device. Control continues at 720, where control provides an auditory message indicating that voice control is now available. Control then continues at 724. Meanwhile, at 716, voice control is deactivated.

At 724, control determines whether the notification is coded as iterative. If so, control transfers to 728; otherwise, control returns to 704. At 728, control begins logging accelerometer data from the wearable device. At 732, control determines whether the task has been cleared. If so, control transfers to 736; otherwise, control transfers to 740.

At 740, if the operator has begun personal time, control transfers to 744; otherwise, control returns to 732. For example, personal time may include taking a break or entering the bathroom. At 744, control pauses logging accelerometer data and continues at 748. At 748, control determines whether the personal time has ended. If so, control transfers to 752; otherwise, control remains at 748. At 752, control resumes logging accelerometer data and control returns to 732.

At 736, control stops logging accelerometer data. At 756, control obtains a stored accelerometer profile for the task. This stored accelerometer profile may be determined experimentally by having a trained operator perform the task and recording accelerometer data. At 760, control compares the logged accelerometer data to the obtained profile and determines the amount of time actually spent properly performing the task.

At 764, control records the duration of the task performance. For example, this may indicate how long the user spent washing hands or how long the user spent sweeping the floor. In other implementations, this may indicate how long the user spent chopping an ingredient. Control then returns to 704.

Wearable Device

Figure 9:
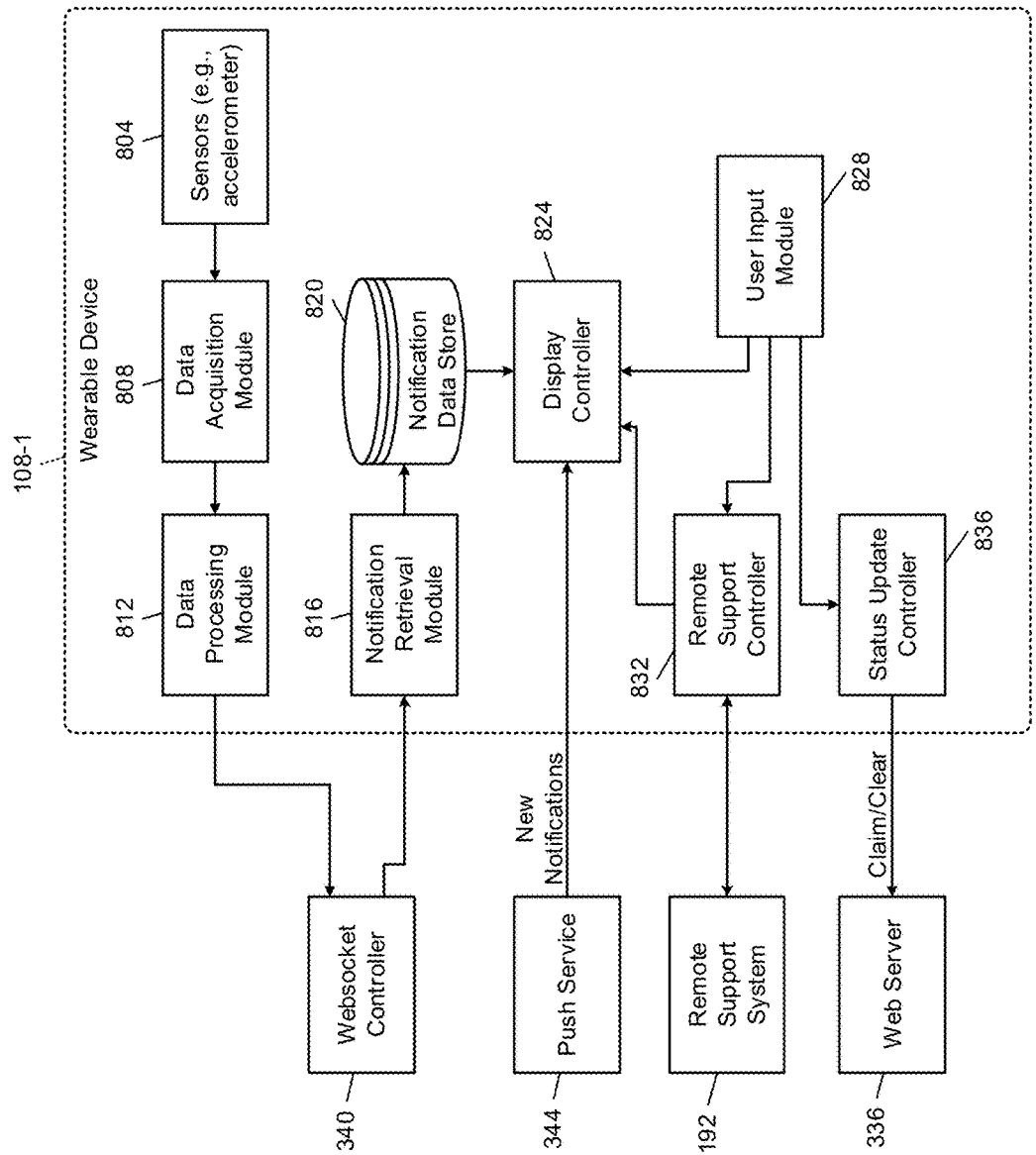
FIG. 9 is a functional block diagram of an example implementation of the wearable device.

In FIG. 9, a functional block diagram of an example implementation of the wearable device 108-1 includes sensors 804, such as an accelerometer. A data acquisition module 808 records information from the sensors 804. A data processing module 812 may evaluate data acquired by the data acquisition module 808. For example, the data processing module 812 may, as described in FIG. 8, assess whether accelerometer data indicates a task being performed properly and/or may determine a length of performance of the task.

The data processed by the data processing module 812 may be provided to the WebSocket controller 340 of the interface system 120 of FIG. 4. The WebSocket controller 340 may also provide notification information to a notification retrieval module 816. The notification retrieval module 816 stores active notifications for the wearable device 108-1 in a notification data store 820.

A display controller 824 reads information about notifications from the notification data store 820 and may also read information about instructions for performing tasks for the notifications. The display controller 824 may also receive notifications from the push service 344. Operation of the display controller 824 may be modified by user input 828, which can include touch input, voice input, and motion input.

A remote support controller 832 can interface with the remote support system 192 in response to the user input 828 indicating that remote support is requested. For example, the remote support controller 832 may provide video or other information to the display controller 824. In other implementations, the remote support controller 832 may activate one or more of the sensors 804 and/or may acquire audio or visual data, such as by taking a picture.

A status update controller 836 operates in response to the user input 828 to generate claim and clear messages indicating the notification has been claimed or cleared. These messages are transmitted to a web server 336. In various implementations, the robots 100 may be exclusively controlled via this HTTP interface.

Figure 10:
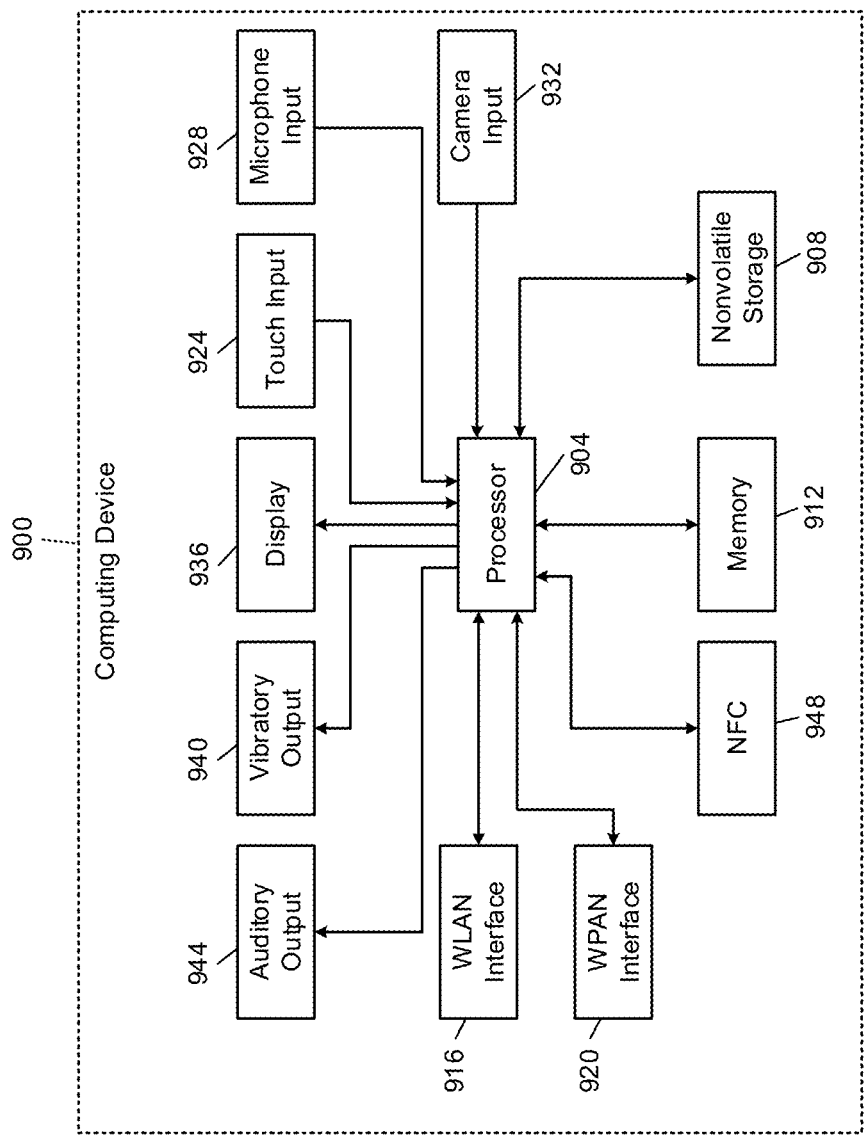
FIG. 10 is a block diagram of an example implementation of a computing device.

In FIG. 10, a simplified block diagram of an example computing device 900 is shown. For example, the computing device 900 may be used to implement the wearable device 108-1, the mobile device 128, the interface system 120, the robot controller 200, etc. The computing device 900 includes one or more processors indicated at 904. The processor executes instructions from nonvolatile storage 908. Instructions may be loaded into memory 912 during execution and data may be stored in the memory 912.

The processor 904 may communicate with a wireless local area network (WLAN), such as IEEE 802.11, via a WLAN interface 916 and/or with a wireless personal area network (WPAN), such as Bluetooth, via a WPAN interface 920. The processor 904 may receive input via touch input 924 and a microphone input 928. The processor 904 may output information to an operator using a graphical display 936 which may be combined with the touch input 924 in the case of a touchscreen.

The processor 904 may receive visual input from a camera input 932. The processor 904 may also output information to an operator using a vibratory output 940 and an auditory output 944, such as a speaker. The processor 904 may also communicate through short-range wireless mechanisms such as near field communication 948 and/or radio frequency identification (RFID) tags and readers (not shown). Further, while not shown, the computing device 900 may be powered by a battery, which may be charged through a wired port and/or wirelessly.

Task Consolidation

To minimize operator trips for efficient and to avoid operators feeling that they are running in circles, the operator interface could inform operators how to pack carts with drinks, glasses, trash bags, hoppers, etc. so that they can handle more tasks on any one trip. A software system alerts store staff on what is about to need reloading across an operation, whether it be a retail store, restaurant, or warehouse. There are basic points across the store where items are prepped and then reloaded or delivered. Between these points are routes, each with a different distance and time of travel.

Figure 11:
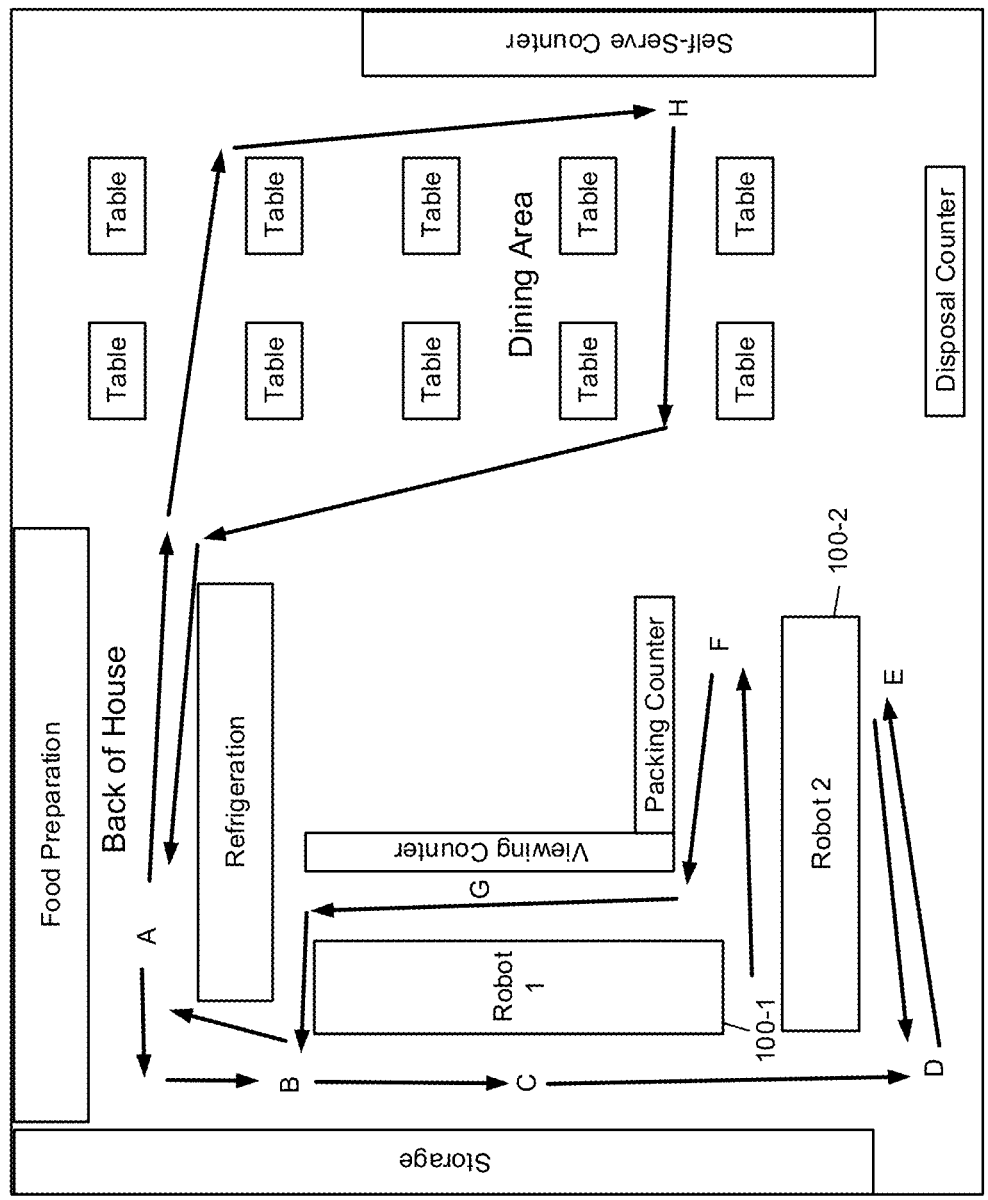
FIG. 11 is a schematic diagram of an example restaurant layout in which the interface system is deployed.

For example, consider the paths through an example restaurant layout shown in FIG. 11. Each point (labeled with a letter) may identify a location where a task is performed. Each route may have a travel cost based at least in part on distance.

Also in the store is one or more operations being performed that require reloading of items to process or manufacture some good. In the case of an automated restaurant, these locations may include a food preparation table, a packing counter, a robot reloading station, a robot unloading station, and a self-serve counter. As the operation runs, various items will get low and need to be reloaded before there is a stock-out (that is, the stock reaches a critical level or even zero).

To prevent stock-outs, employees will travel through routes in the store and deliver new items where needed. In order to minimize trips and employee labor, as much work should be done on each trips as possible. To accomplish this, the operating software tracks inventory items based on orders that are coming through the store. There would be a constant queue kept of all the items as they approach their Min Level and what route of the store they are on (for example, a front-of-house route or a back-of-house route).

In one example, the operator interface may determine that an operator will be passing by a certain location on their way to perform a claimed task. At the location, another task may need to be performed, which might be as simple as picking up an empty container and returning it to another location. If the operator interface determines that this additional task will not detract from the operator's claimed task, the operator interface may notify the operator of this additional task to perform.

A run lead time calculation may continuously be performed when an operator is preparing to reload. The operator may prepare and add items to a cart until either the cart is full or the run lead time calculation is approaching a point where a stock-out is imminent. At that point, the operator interface would instruct the user to make the reloading run and then to return to the prep area for additional items. Along the way the operator may be requested to refill various items and clear any used containers like hoppers.

For example, the Run lead time decision steps may determine, for each item in a list of items to be reloaded:

Item 1: Prep time 1+pack time 1+travel time 1+reload time 1

The operator will pack item 1.

Item 2: Prep time 1+pack time 1+travel time 1+reload time 1+Item time 1

If this sum for item 2 is less than the stock-out time of item 1, item 2 will be packed.

Item 3: Prep time 1+pack time 1+travel time 1+reload time 1+Item time 1 through 2

If this sum for item 3 is less than the stock-out time of item 2, then item 3 will be packed as well Item 4: Prep time 1+pack time 1+travel time 1+reload time 1+Item time 1 thru 3

If this sum for item 4 is less than the stock-out time of item 3, then item 4 will be packed as well. As an example, consider when the sum is greater than the stock-out time of item 3. Then item 4 would not be packed.

Item 5: travel time 1-5+pickup time 5+Item time 1 thru 4

Picking up an item on the return can be performed without negatively impacting the likelihood of a stock-out.

Various models may be used to control the operator interface, such as EOQ (economic order quantity, which balances ordering costs and storage costs), VED (vital/essential/desirable) analysis, the FSN (Fast-moving, Slow-moving, Non-moving) method, Markovian queuing, and minimum safety stock.

Figure 12:
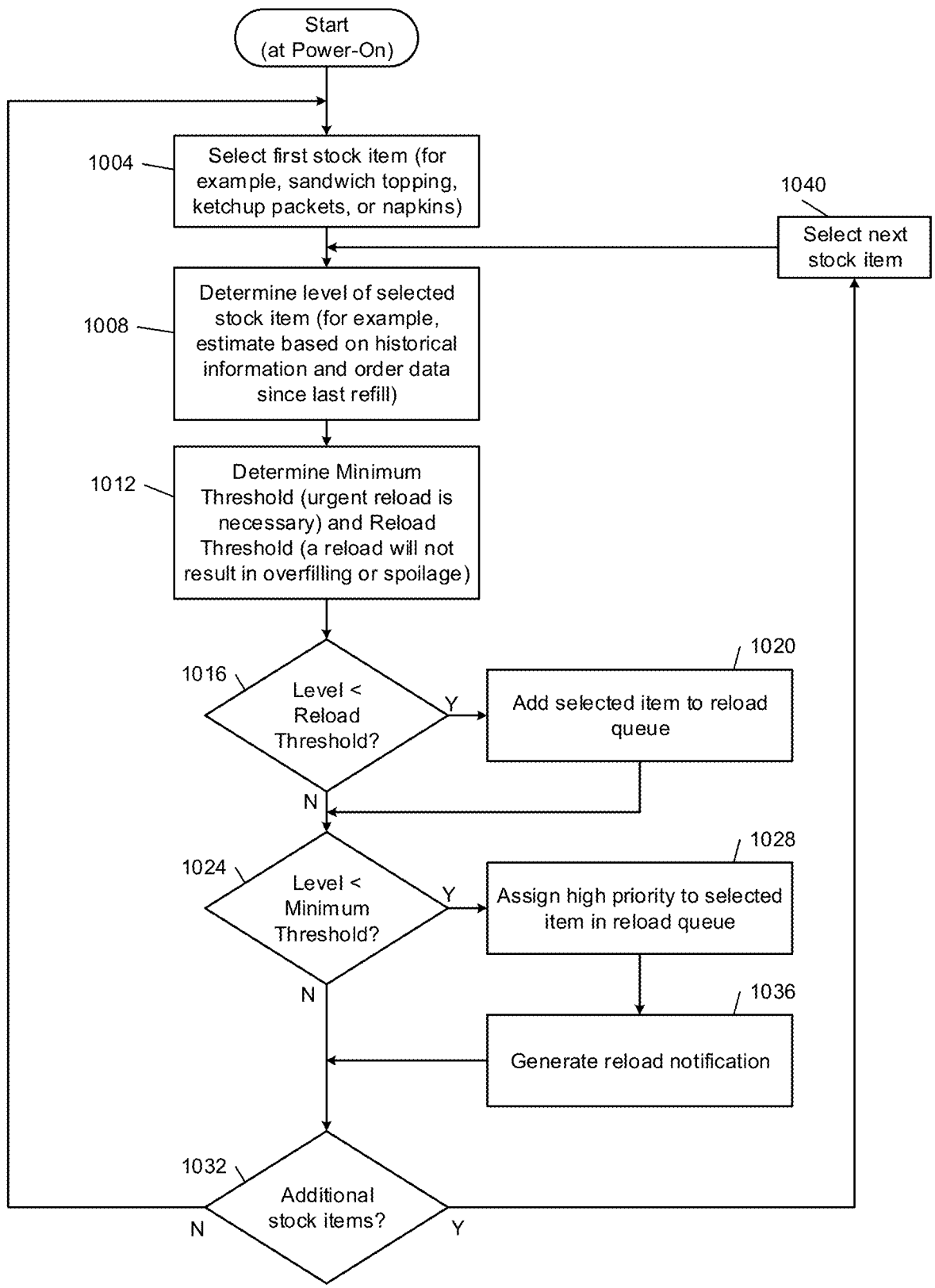
FIG. 12 is a flowchart of example computerized stock management operation according to the principles of the present disclosure.

In FIG. 12, a flowchart presents example operation for evaluating levels of stock items. For example, stock items may include sandwich or hamburger toppings for use by the robot, or other service items, such as glasses, ketchup packets, napkins, etc. Control begins at 1004, where the first stock item in a list of stock items is selected. The list of stock items may be established when the restaurant is first configured. For example, the list of stock items may be a predetermined list that is supplemented by special ingredients or other items specific to the restaurant.

Control continues at 1008, where control determines the level of the selected stock item. For example, a sensor on the robot may directly determine the level of the selected stock item. In other implementations, the level of the selected stock item may be estimated based on order data since the stock item was last refilled. For example, the number of tomato slices required for orders placed since tomatoes were last refilled may indicate how much of the tomato supply has been exhausted.

Historical information may be used to increase the accuracy of this prediction. For example, historical data may indicate that slightly more or less tomato is consumed then an open-loop estimation of tomato usage would otherwise indicate. For example, this historical information may account for waste or other product that is not directly included in an order.

Other stock items may not be directly tied to orders. For example, napkins or water glasses may be obtained by customers as needed. However, historical information may suggest that, as described above, dine-in customers on average will obtain approximately a 1:1 ratio of hamburgers to drinks. Therefore, if a drink is not purchased for a hamburger, a reasonable inference may be that one water glass will be used. The order data can accordingly be used to infer the number of water glasses used since the last refill.

Other items, such as napkins, may be consumed based on historical information. For example, the number of napkins that are obtained on average per order may be determined historically and may be adjusted up or down based on order information. For example, customers who order fries may, on average, retrieve additional napkins. After the level of the selected stock items determined, control continues at 1012.

At 1012, control determines a minimum threshold and a reload threshold for the selected stock item. The minimum threshold corresponds to a level at which an urgent reload is necessary. For example, the minimum threshold may be determined so that an adequate operating buffer is maintained below which the level of the stock item does not fall. The reload threshold is higher and corresponds to a stock level at which reloading will not result in overfilling the stock item or spoilage. For example, loading additional tomatoes during a time when tomatoes are not in demand may cause the tomatoes to be out of refrigeration for too long and therefore will be discarded before being used for an order. Accordingly, the reload threshold may depend on current usage levels and predicted usage levels. Similarly, the minimum threshold may also vary based on consumption rates.

At 1016, control determines whether the level of the stock item is below the reload threshold. If so, control transfers to 1020; otherwise, control transfers to 1024. At 1020, the selected item is suitable for reloading and therefore the second item is added to a reload queue. If the selected item is already in the reload queue, the item is not added a second time. If multiple locations use the same stock item, these may be treated as separate stock items. For example, the tomatoes supplying a first robot may be treated separately from tomatoes supplying a second robot.

As described previously, a stock item that is less frequently ordered, at least at the current time of day or current day of the week or year, may be assigned to only a single one of the robots so that the stock item does not have to be maintained in multiple robots. The operator interface may therefore determine that once the level of a certain stock item at the first robot falls below threshold, reloads may be stopped for that ingredient. Therefore, the other robot or robots will be used to fulfill orders requiring that ingredient.

Control continues from 1020 to 1024. If, at 1024, the level of the stock item is less than the minimum threshold, control transfers to 1028; otherwise, control transfers to 1032. At 1028, control assigns a high priority to the selected item in the reload queue. In various implementations, the priority may be adjusted based on how necessary the stock item is. For example, meat may be required for every hamburger and therefore receives the highest priority. Meanwhile, a certain seasoning or sauce may be required only for certain orders and therefore is not as high a priority, since its absence will not stop all workers from proceeding. Control continues at 1036, where a reload notification is generated and distributed to the operators. Control then continues at 1032. At 1032, if there are additional stock items, control transfers to 1040; otherwise, control returns to 1004. At 1040, control selects the next stock item and returns to 1008.

Figure 13A:
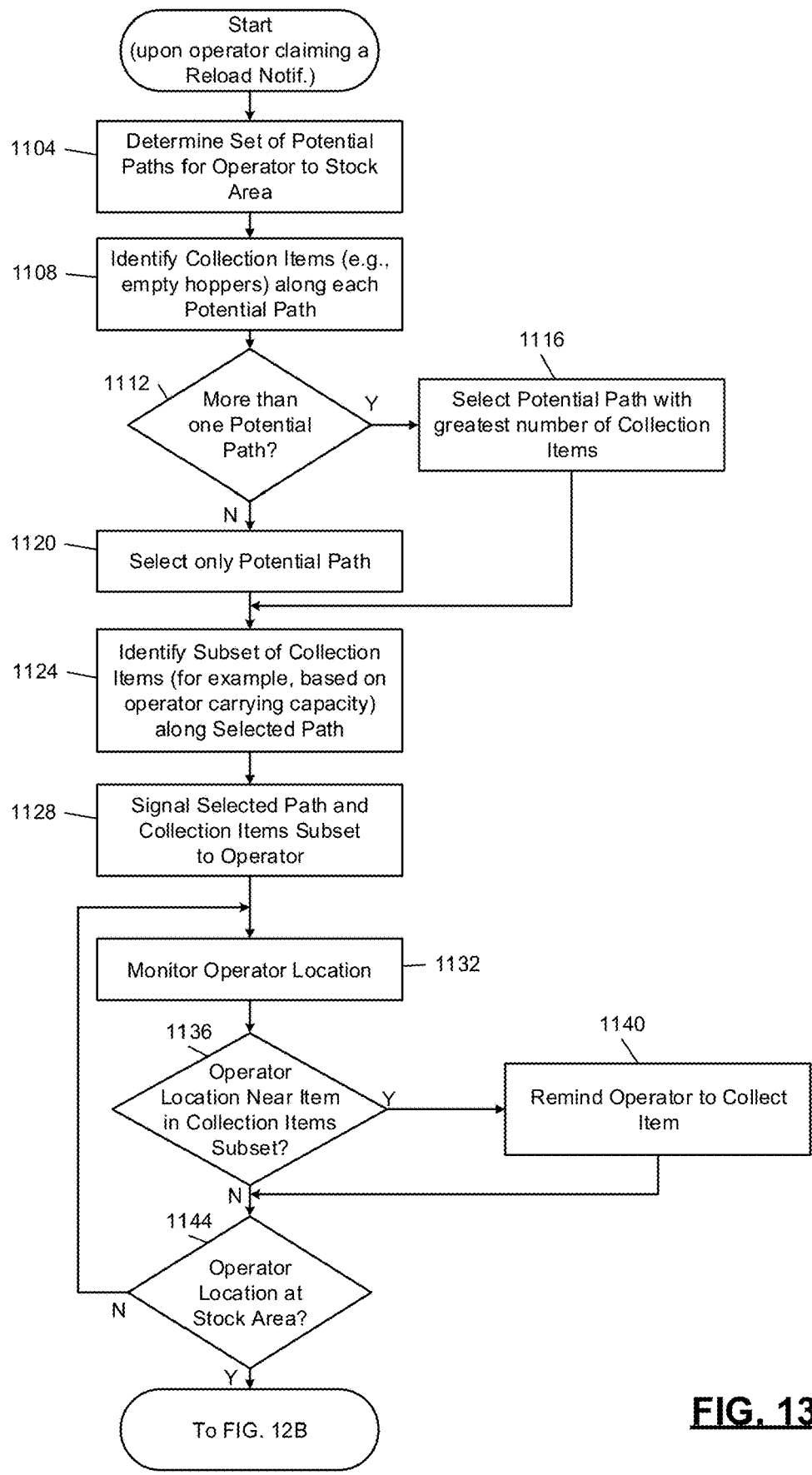

Together, FIGS. 13A and 13B describe an example process for consolidating tasks for an operator who has claimed a reload identification. Therefore, control begins at 1104 upon an operator claiming an outstanding reload notification. Based on the operator's location, control determines a set of potential paths for the operator to traverse back to the stock area where additional stock items they found. In various limitations, there may be multiple stock areas, such as a cooler for food items and a pantry for paper goods. Therefore, the appropriate stock area may be determined based on the stock item specified by the reload notification.

Control continues at 1108, where control identifies collection items on each of the potential paths. For example, the collection items may include empty hoppers from robots, full garbage bags, trays of used water glass, etc. At 1112, control determines whether there is more than one potential path. If so, control transfers to 1116; otherwise, control transfers to 1120. At 1116, control selects the potential path with the greatest number of collection items and continues at 1124. At 1120, control selects the only potential path and continues at 1124.

At 1124, control identifies a subset of the identified collection items that are present along the selected path. The subset may include all of the collection items on the selected path or may be limited to only those collection items that the operator can carry at one time. The operator's carrying capacity may be determined may be based on empirical studies and may vary per operator. For example, a more experienced operator may be able to carry more collection items. At 1128, control signals the selected path to the operator and identifies the subset of collection items for collection by the operator while traveling along the selected path.

At 1132, control monitors the operator's location. At 1136, control determines whether the operator location is near one of the items in the collection items subset. If so, control transfers to 1140; otherwise, control transfers to 144. At 1140, control reminds the operator to collect the item that is in proximity to the operator. For example, this reminder may be a transient notification on a wearable device that clears after a predetermined number of seconds or as the operator's location diverges from the location of the item. Control then continues at 1144. At 1144, control determines whether the operator location has reached the appropriate stock area. If so, control transfers to 1148 of FIG. 13B; otherwise, control returns 1132.

In FIG. 13B, control at 1148 sets a cumulative time value to zero and clears a task list. The task list will contain the stock items that the operator will reload in response to the current notification. At a high level, the task list will be formed from the highest-priority items that need to be reloaded and will be limited based on a number of factors, such as avoiding one of the items reaching a critical level or running out completely. Further, the task list may be limited based on the number of stock items that the operator can transport at one time, such as on a cart of defined dimensions.

Control continues at 1152, where control selects the highest-priority item in the reload queue. Control continues at 1156, where control determines a number of times for the selected item. For example, the relevant times may include a preparation time (such as slicing vegetables), a pack time (such as for loading sliced vegetables or whole buns into a hopper), a travel time to the location of the reload, and a reload time required to perform the reload. In various implementations, the preparation time may be zero if the stock item has already been prepared, such as at the beginning of a shift or prior to daily opening of the restaurant.

Control continues at 1160, where control calculates a Sum of prep time, pack time, travel time, and reload time. Control continues at 1164, where control determines whether the cumulative time plus the sum is less than the estimated remaining time for the selected item before the site that reaches a critical or zero level. If the cumulative time plus the sum is less than the remaining time, control transfers to 1168; otherwise, control transfers to 1172.

At 1168, there is sufficient time to reload another item but there may not be sufficient space. Therefore, control determines whether the space for the existing task list items as well as the selected item can be accommodated by the carrying cart. If so, control transfers to 1176; otherwise, control transfers to 1180. At 1176, there is sufficient time and space and therefore the selected item is added to the task list. In addition, the cumulative time is increased by the value of the Sum. Control continues at 1184. At 1184, control determines whether additional items are present in the reload queue. If so, control transfers to 1192; otherwise, control transfers to 1180. At 1192, control selects the next-highest-priority item from the reload queue and returns to 1156.

At 1180, there are no additional items in the reload queue or there is no additional space in the carrying cart or there is not sufficient time to reload another item. Therefore, control provides the task list to the operator. For example, the task list may be shown to the operator as an overview followed by individual instructions for preparation, packing, travel, and reloading. Control then ends.

At 1172, there is not sufficient time to reload the selected item. However, if the task list is empty, the operator should not simply reload nothing. Therefore, if the task list is empty at 1172, control transfers to 1188; otherwise, control transfers to 1180. At 1188, control adds the selected item to the task list. Because there is not sufficient time to reload the selected item prior to the critical level of the stock items being reached, control alerts the operator to the urgency. In various applications, there may be some ability to perform certain tasks in parallel, such as by one person performing preparation while another operator performs packing. As another example, another operator may begin the reload process such as by removing an empty container in preparation for the new container arriving. In this way, the time constraints may be satisfied and the estimated critical or zero level may not be reached. In such cases, the system may generate a notification urgently requesting another operator to assist the current operator in the reload process. Control continues at 1180, where the task list is provided to the operator.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A robotics control system comprising:
    a robot controller for a robot; and
    an interface system,
    wherein the robot controller is configured to, in response to a first condition in a first subsystem of the robot:
        halt operation of the first subsystem;
        transmit a set command specifying a first notification to the interface system;
        obtain status information from the interface system regarding the first notification; and
        in response to the status information indicating that the first notification has a cleared status, resume operation of the first subsystem; and
    wherein the interface system is configured to:
        maintain a set of active notifications;
        track a set of devices configured to receive notifications, wherein each of the set of devices is associated with a respective operator; and
        in response to receiving the set command from the robot controller:
            add the first notification to the set of active notifications;
            determine a first subset of devices of the set of devices to receive the first notification;
            wirelessly transmit the first notification to the first subset of devices; and
            in response to receiving a clear message specifying the first notification from one of the first subset of devices, set the first notification to the cleared status in the set of active notifications.

2. The robotics control system of claim 1, wherein the robot controller is configured to, in response to a second condition in the first subsystem of the robot, transmit a set command specifying a second notification to the interface system while continuing operation of the first subsystem.

3. The robotics control system of claim 2, wherein the robot controller is configured to, when a clear-on-raise relationship is present between the first notification and the second notification, set the second notification to the cleared status in response to the first condition.

4. The robotics control system of claim 3, wherein the robot controller is configured to:
    maintain an internal set of active notifications; and
    set the second notification to the cleared status by setting the second notification to the cleared status in the internal set of active notifications.

5. The robotics control system of claim 3, wherein the robot controller is configured to set the second notification to the cleared status by transmitting a clear command specifying the second notification to the interface system.

6. The robotics control system of claim 3, wherein:
    the first condition corresponds to a parameter of the first subsystem crossing a first threshold; and
    the second condition corresponds to the parameter of the first subsystem crossing a second threshold different than the first threshold.

7. The robotics control system of claim 1, wherein the robot controller is configured to:
    identify a resumption condition based on a physical sensor associated with the first subsystem; and
    in response to identifying the resumption condition, transmit a clear command specifying the first notification to the interface system.

8. The robotics control system of claim 1, wherein:
    the interface system is configured to operate a hypertext transfer protocol (HTTP) server; and the robot controller is configured to transmit the set command to the interface system by transmitting a first HTTP request to the HTTP server.

9. The robotics control system of claim 8, wherein the robot controller is configured to obtain status information from the interface system by transmitting a second HTTP request to the HTTP server.

10. The robotics control system of claim 1, wherein the robot controller is configured to transmit a set of potential notifications to the interface system in response to power-on of the robot.

11. The robotics control system of claim 10, wherein the robot controller is configured to:
assemble the set of potential notifications from a plurality of subsystems of the robot, including the first subsystem; and
tag each of the set of potential notifications with a corresponding identifier of one of the plurality of subsystems.

12. The robotics control system of claim 1, wherein the robot controller is configured to receive the first notification from the first subsystem in response to the first subsystem identifying the first condition.

13. The robotics control system of claim 12, wherein the robot controller is configured to tag the first notification with an identifier of the first subsystem and specify the tag when transmitting the set command to the interface system.

14. The robotics control system of claim 1, wherein:
the robot controller is configured to operate first and second network interfaces;
the first and second network interfaces are isolated from each other and not routable between each other;
the first network interface is configured to communicate with a plurality of subsystems of the robot, including the first subsystem; and
the second network interface is configured to communicate with the interface system.

15. The robotics control system of claim 14, wherein:
the second network interface is configured to communicate with an ordering system; and
the robot controller is configured to, in response to receiving specification of a food item from the ordering system, control the first subsystem to prepare the food item.

16. The robotics control system of claim 1, wherein the interface system is configured to:
for each device of the set of devices, assign a role from a predetermined plurality of roles; and
determine the first subset of devices based on the assigned roles.

17. The robotics control system of claim 16, wherein the interface system is configured to, for each device of the first subset of devices, assign a priority for the first notification based on the assigned role.

18. The robotics control system of claim 1, wherein the interface system is configured to:
for each device of the first subset of devices, provide the first notification to the device in response to a connection request from the device; and
selectively provide the first notification to a push service for distribution to the first subset of devices.

19. The robotics control system of claim 1, wherein:
the interface system is configured to operate a hypertext transfer protocol (HTTP) server; and
the interface system is configured to receive the clear message from the one of the first subset of devices via a first HTTP request to the HTTP server.

20. The robotics control system of claim 1, wherein the interface system is configured to:
operate a hypertext transfer protocol (HTTP) server;
selectively receive a claim message from one of the first subset of devices via a first HTTP request to the HTTP server; and
in response to receiving the claim message, notify a remainder of the first subset of devices that the first notification has been claimed.

* * * * *